United States Patent
Zhang et al.

(10) Patent No.: US 12,475,634 B2
(45) Date of Patent: Nov. 18, 2025

(54) METHOD AND APPARATUS FOR DISPLAYING THREE-DIMENSIONAL OBJECT BY FOLLOWING POSITIONS OF THE HUMAN EYE, AND DEVICE AND MEDIUM

(71) Applicant: Beijing Bytedance Network Technology Co., Ltd., Beijing (CN)

(72) Inventors: Yuanhuang Zhang, Beijing (CN); Jing Du, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/698,279

(22) PCT Filed: Sep. 21, 2022

(86) PCT No.: PCT/CN2022/120164
§ 371 (c)(1),
(2) Date: Apr. 3, 2024

(87) PCT Pub. No.: WO2023/056840
PCT Pub. Date: Apr. 13, 2023

(65) Prior Publication Data
US 2024/0404175 A1    Dec. 5, 2024

(30) Foreign Application Priority Data
Oct. 9, 2021    (CN) .......................... 202111175738.8

(51) Int. Cl.
*G06T 15/10* (2011.01)
*G06F 3/01* (2006.01)
(Continued)

(52) U.S. Cl.
CPC .............. *G06T 15/10* (2013.01); *G06F 3/013* (2013.01); *G06T 7/70* (2017.01); *G06T 15/60* (2013.01); *G06T 2207/30201* (2013.01)

(58) Field of Classification Search
CPC .......... G06F 3/011; G06F 3/012; G06F 3/013; G06T 15/00; G06T 15/005; G06T 15/02;
(Continued)

(56) References Cited

U.S. PATENT DOCUMENTS

| | | | |
|---|---|---|---|
| 2003/0146901 A1* | 8/2003 | Ryan ..................... | G06V 40/171 345/158 |
| 2005/0190181 A1* | 9/2005 | Sakagawa ............... | G06T 15/60 345/419 |

(Continued)

FOREIGN PATENT DOCUMENTS

| CN | 103076681 B | 1/2016 |
|---|---|---|
| CN | 108182659 A | 6/2018 |

(Continued)

OTHER PUBLICATIONS

International Search Report and Written Opinion for PCT/CN2022/120164, mailed Dec. 2, 2022, 9 pages.

(Continued)

*Primary Examiner* — Benjamin C Lee
*Assistant Examiner* — Nelson Lam
(74) *Attorney, Agent, or Firm* — Astute IP Law Group

(57) ABSTRACT

The disclosed embodiment provides a displaying method for a three-dimensional object, an apparatus, a device, and a medium. The method includes: acquiring a plurality of pieces of original position information of a plurality of associated three-dimensional points in a target object model, acquiring human eye position information of human eye, and acquiring display position information of a preset picture display region in a picture display device; determining (Continued)

a plurality of pieces of projection position information of the plurality of associated three-dimensional points on the picture display region according to the plurality of pieces of original position information, the human eye position information, and the display position information; and generating and rendering a projection picture of the target object model in the picture display region according to the plurality of pieces of projection position information.

18 Claims, 15 Drawing Sheets

(51) Int. Cl.
*G06T 7/70* (2017.01)
*G06T 15/60* (2006.01)

(58) Field of Classification Search
CPC ......... G06T 15/04; G06T 15/06; G06T 15/08; G06T 15/10; G06T 15/20
USPC .................................................. 345/156–158
See application file for complete search history.

(56) References Cited

U.S. PATENT DOCUMENTS

| | | | | |
|---|---|---|---|---|
| 2007/0008313 | A1* | 1/2007 | Song | H04N 13/10 348/E13.064 |
| 2007/0291035 | A1* | 12/2007 | Vesely | G09B 9/00 345/427 |
| 2012/0154277 | A1* | 6/2012 | Bar-Zeev | G02B 27/017 345/158 |
| 2014/0085342 | A1* | 3/2014 | Shoemaker | G06V 40/18 345/672 |
| 2014/0225887 | A1* | 8/2014 | Aguirre-Valencia | H04N 13/279 345/419 |
| 2014/0306883 | A1* | 10/2014 | Yuan | G06F 3/0481 345/156 |
| 2014/0327613 | A1* | 11/2014 | Chessa | G06T 15/08 345/156 |
| 2015/0177833 | A1* | 6/2015 | Vennstrom | G06T 7/73 345/156 |
| 2015/0206338 | A1* | 7/2015 | Miura | G06T 15/205 345/419 |
| 2018/0213193 | A1 | 7/2018 | Yakel et al. | |
| 2020/0035034 | A1 | 1/2020 | Wang et al. | |
| 2020/0134927 | A1 | 4/2020 | Huang et al. | |
| 2022/0078390 | A1 | 3/2022 | Jingu | |
| 2023/0152597 | A1* | 5/2023 | Xu | G02B 27/0176 345/156 |

FOREIGN PATENT DOCUMENTS

| | | |
|---|---|---|
| CN | 108830907 B | 2/2021 |
| CN | 112672139 A | 4/2021 |
| WO | 2021197189 A1 | 10/2021 |

OTHER PUBLICATIONS

Chen et al., "Visual Display Method for Grating Projection Measurement System", Modular Machine Tool & Automatic Manufacturing Technique, No. 9, Sep. 2017, 6 pages.

Office Action for Chinese Patent Application No. 202111175738.8, mailed on Jun. 19, 2025, 15 pages.

* cited by examiner

METHOD AND APPARATUS FOR DISPLAYING THREE-DIMENSIONAL OBJECT BY FOLLOWING POSITIONS OF THE HUMAN EYE, AND DEVICE AND MEDIUM

The present disclosure is the national phase application of International Patent Application No. PCT/CN2022/120164, filed on Sep. 21, 2022, which claims the priority of a Chinese patent application No. 202111175738.8 submitted to the China National Intellectual Property Administration of the People's Republic of China on Oct. 9, 2021, with the invention title of "A Displaying Method for A Three-dimensional Object, An Apparatus, A Device, and A Medium". All the aforementioned patent applications are hereby incorporated by reference in their entireties.

TECHNICAL FIELD

The present disclosure relates to the technical field of image processing, and in particular, to a displaying method for a three-dimensional object, an apparatus, a device, and a medium.

BACKGROUND

To enhance the immersive perception experience, it is quite common to achieve three-dimensional picture display. For example, using three-dimensional technology to display during viewing can enhance a user's viewing realism. For example, in a somatic game, assisting with three-dimensional technology can enhance the game's realism.

In a related technology, a polarizer is added to a display screen so that two pictures in different polarization directions can be conveyed to a viewing user. When pictures pass through polarized glasses, since each lens of the polarized glasses can only accept the pictures in one polarization direction, the left eye and the right eye of the viewing user can receive two sets of pictures, and then synthesized by the brain into three-dimensional images, thereby realizing a three-dimensional viewing effect by naked eyes.

However, the above-mentioned method of achieving the three-dimensional viewing effect based on the principle of polarized light requires adding the polarizer on the display screen and also requires wearing the polarized glasses, leading to a high three-dimensional display cost.

SUMMARY

In order to solve the above-mentioned technical problems or at least partially solve them, this disclosed embodiment provides a displaying method for a three-dimensional object, an apparatus, a device, and a medium.

The disclosed embodiments provide a displaying method for a three-dimensional object, comprising: acquiring a plurality of pieces of original position information of a plurality of associated three-dimensional points in a target object model, acquiring human eye position information of human eye, and acquiring display position information of a preset picture display region in a picture display device; determining a plurality of pieces of projection position information of the plurality of associated three-dimensional points on the picture display region according to the plurality of pieces of original position information, the human eye position information, and the display position information; and generating and rendering a projection picture of the target object model in the picture display region according to the plurality of pieces of projection position information.

The disclosed embodiments further provide a displaying apparatus for a three-dimensional object, comprising: an acquiring module configured to acquire a plurality of pieces of original position information of a plurality of associated three-dimensional points in a target object model, acquire human eye position information of human eye, and acquire display position information of a preset picture display region in a picture display device; a determining module configured to determine a plurality of pieces of projection position information of the plurality of associated three-dimensional points on the picture display region according to the plurality of pieces of original position information, the human eye position information, and the display position information; and a rendering module configured to generate and render a projection picture of the target object model in the picture display region according to the plurality of pieces of projection position information.

The disclosed embodiments further provide an electronic device, comprising: a processor; and a memory configured to store instructions executable by the processor, wherein the processor is configured to read the executable instructions from the memory and execute the instructions to implement the displaying methods for a three-dimensional object provided by the disclosed embodiments.

The disclosed embodiments further provide a computer-readable storage medium, storing a computer program configured to perform the displaying methods for a three-dimensional object provided by the disclosed embodiments.

BRIEF DESCRIPTION OF THE DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

DETAILED DESCRIPTION

Figure 1:
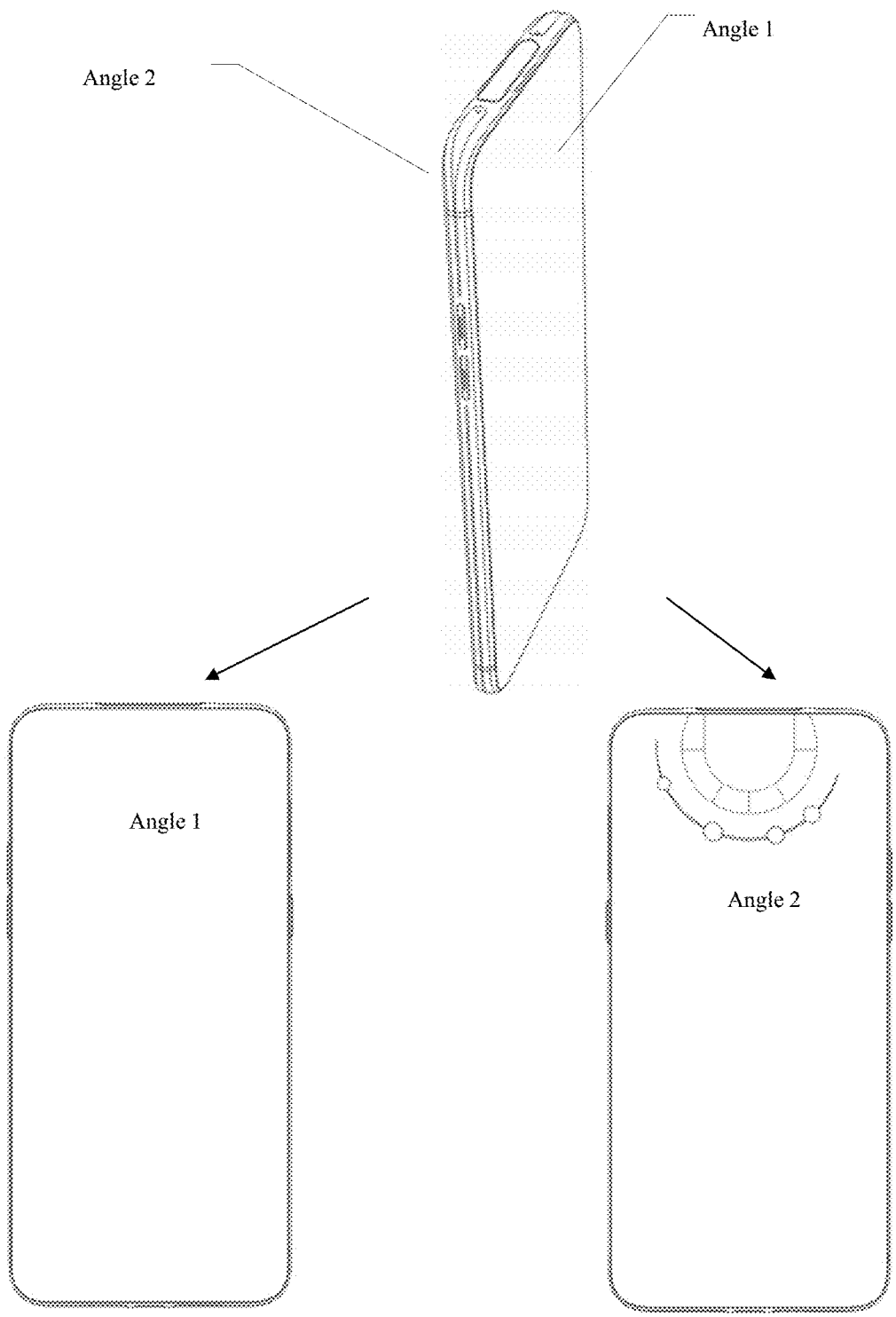
FIG. 1 is a schematic diagram of a three-dimensional object displaying scenario provided in an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information exchanged between multiple apparatuses in this disclosed embodiment are for illustrative purposes only and are not intended to limit the scope of these messages or information.

To solve the above-mentioned problem of high three-dimensional display cost, an embodiment of the present disclosure provides adjusting a projection picture being displayed to a user by following a position of the user's glasses without the aid of an external device. As shown in FIG. 1, in the event that a displayed object is a mobile phone, and when the user's eyes are at angle 1, an image of the mobile phone at the angle 1 is displayed to the user; and when the user's eyes are at angle 2, an image of the mobile phone at the angle 2 is displayed to the user. Thus, a three-dimensional display effect is achieved by adjusting projection angles corresponding to projection pictures of the mobile phone according to the positions of the user's eyes without the need for an external auxiliary device such as polarized glasses to assist displaying, and therefore, the display cost is low and the user does not need to wear the auxiliary device with good comfort during viewing.

A displaying method for a three-dimensional object provided in an embodiment of the present disclosure will be described below in conjunction with specific embodiments.

Figure 2:
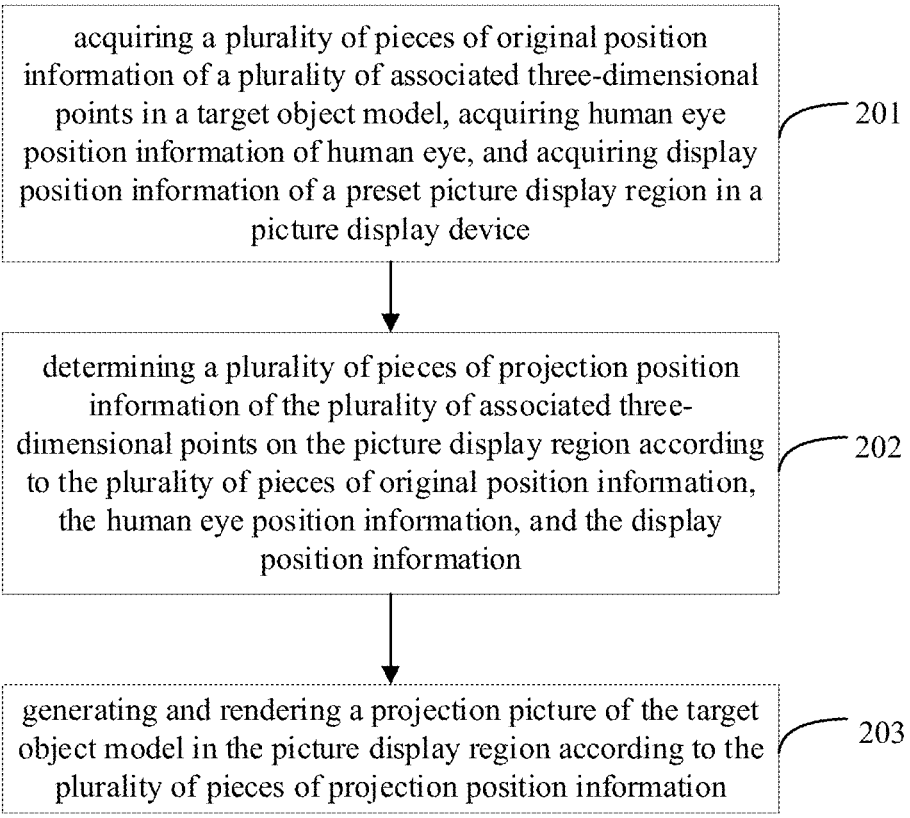
FIG. 2 is a flow schematic diagram of a displaying method for a three-dimensional object provided in an embodiment of the present disclosure.

FIG. 2 is a flow schematic diagram of a displaying method for a three-dimensional object provided in an embodiment of the present disclosure. The method may be performed by a display apparatus which may be implemented by software and/or hardware and may be generally integrated in an electronic device. The displaying method for the three-dimensional object may be applied to any electronic device with a display screen. The electronic device may be a smart phone, a laptop, and the like, or may be a wearable device and the like. As shown in FIG. 2, the method includes:

Step 201, acquiring a plurality of pieces of original position information of a plurality of associated three-dimensional points in a target object model, acquiring human eye position information of human eye, and acquiring display position information of a preset picture display region in a picture display device.

In the present embodiment, to achieve the effect of adjusting a display angle by following the position of the human eye, the human eye position information of the human eye, a plurality of pieces of original position information of a plurality of associated three-dimensional points in the target object model, and the display position information of the preset picture display region in the picture display device are acquired. Among them, the picture display region may be the whole display screen region of the display device, or may be a partial region on the display screen that is specified to display related pictures. The human eye in the present embodiment may refer to a position between a left eye and the right eye, or may be any one of the left eye and the right eye. Thus, a monocular three-dimensional effect of viewing can be achieved and three-dimensional viewing cost can be further reduced.

In addition, the human eye position information in the present embodiment may be construed as relative position coordinates of the human eye relative to the picture display region in a three-dimensional space.

In the present embodiment, for ease of calculation, the human eye position information may also be absolute position coordinates in the space, and in this case, a coordinate system of the picture display region needs to be aligned to World Coordinate System. In the present embodiment, gyroscope data of the display device in where the picture display region located is acquired, and coordinates are aligned based on the gyroscope data and predetermined orientation data of the display device. Among them, the orientation data is locating data under a coordinate system specified to locate a display orientation of the picture display region of the display device. For example, the zero-point coordinates of the coordinate system corresponding to the orientation data are aligned with the zero-point coordinates under a coordinate system corresponding to the gyroscope data. Thus, the human eye position information under the coordinate system of the display orientation after the human eye being relatively aligned is the absolute position coordinates under the world coordinate system.

It needs to be noted that to guarantee no distortion in displaying, no matter whether the human eye position information is relative coordinates or absolute coordinates, consistency with a reference coordinate system of all other position coordinates involved in subsequent embodiments needs to be maintained. For example, when the human eye position information of the human eye is absolute position coordinates under an orientation coordinate system aligned relative to the gyroscope, original position information of the target object model involved in subsequent embodiments and camera position information and projection parameter matrix of a subsequent camera model should be absolute position coordinates under the orientation coordinate system aligned relative to the gyroscope. For ease of description, position coordinates involved in subsequent embodiments may be construed as coordinates under World Coordinate System, which will not be redundantly described subsequently.

In the present embodiment, the target object model is a target with the three-dimensional display effect to be provided to the human eye in the space and may be any three-dimensional object. The associated three-dimensional points of the target object model may be all vertexes of the target object model, each point in the target object model, or points in all outlines in the target object model and the like. In the present embodiment, for high efficiency of rendering the projection picture, the associated three-dimensional points may be construed as all vertexes of the target object model. The original position information of the associated three-dimensional points may be predetermined and calibrated, and determination methods thereof are not limited in the present embodiment. For example, when the original position information is world coordinates, structured light may be projected to the target object model by a structured light camera based on the structured light technology; depth information of the target object model is acquired based on demodulation of a modulated image of structured light by the target object model; and coordinate transformation calculation is performed based on the depth information and camera parameters of the structured light camera to acquire the original position information of the target object model.

For another example, when the target object model is established by a three-dimensional model establishment tool, the original position information of the associated three-dimensional points in the target object model may be obtained by reading based on the model establishment data of the three-dimensional model establishment tool.

Step 202, determining a plurality of pieces of projection position information of the plurality of associated three-dimensional points on the picture display region according to the plurality of pieces of original position information, the human eye position information, and the display position information.

It will be understood that when the human eye is not in a positive vertical direction relative to the picture display region, the target object model viewed by the human eye is actually an oblique projection effect of the target object model relative to the human eye position information.

Figure 3:
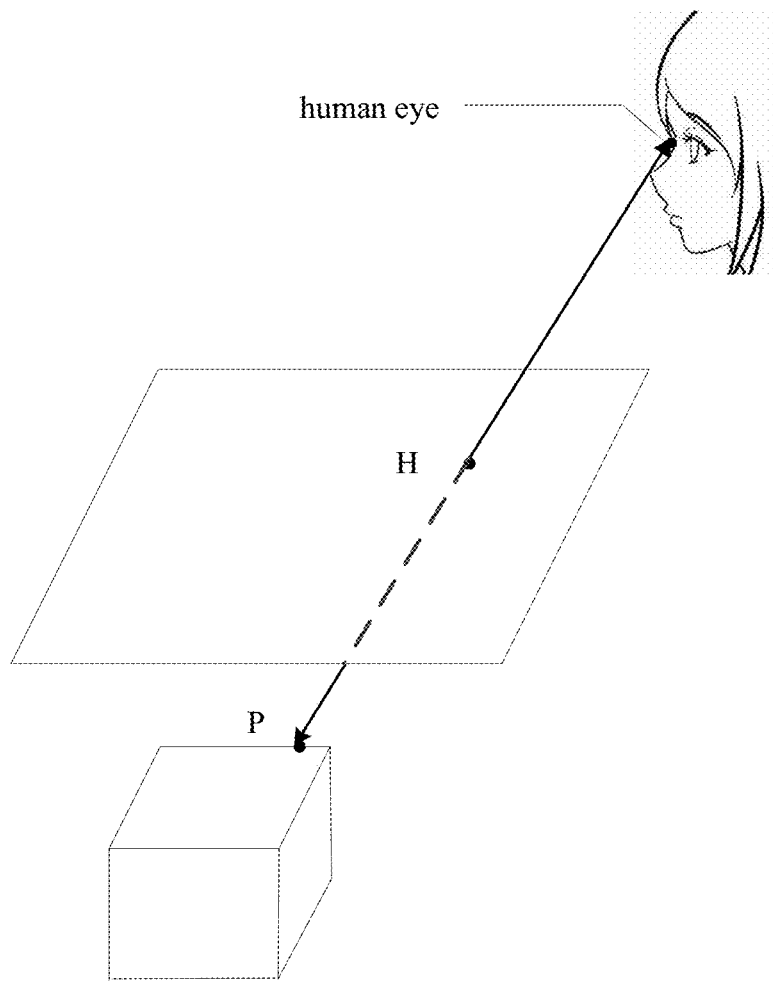
FIG. 3 is a schematic diagram of a rendering scenario of a three-dimensional object provided in an embodiment of the present disclosure.

For example, as shown in FIG. 3, when the target object model is a cube, for the associated three-dimensional point P in the cube, the position of P viewed by the human eye is actually ought to be point H in a picture according to a sight line light path corresponding to the human eye position information. Therefore, if the pixel value of the point H may be set to the pixel value of pixel P, it is apparent that no matter where the human eye position information is located, it will form a stereoscopic viewing effect that follows the user's eye position to switch display angles.

Therefore, in the present embodiment, the projection position information of the associated three-dimensional points on the picture display region is determined according to the human eye position information, the original position information, and the display position information. The projection position information may be construed as projection position information points of the associated three-dimensional points that are viewed according to the human eye position information and projected onto the picture display region when transferred in the sight line light path.

It needs to be noted that the ways of determining the projection position information of the associated three-dimensional points on the picture display region according to the human eye position information, the display position information, and a plurality of pieces of original position information are different in different application scenarios, as shown in the following examples.

In one embodiment of the present disclosure, the corresponding projection position information points are determined according to the direction of the sight line light path of the human eye.

In the present embodiment, continuously referring to FIG. 3, a connecting straight line of the human eye position information and each piece of original position information may be constructed. The connecting straight line is the direction of the sight line light path, and an intersection point of the connecting straight line with the display position information corresponding to the picture display region is the projection position information.

In another embodiment of the present disclosure, a deep learning model is pre-trained according to mass sample data. An input to the deep learning model is the human eye position information, the original position information of the associated three-dimensional point in the picture display region and the picture display position information, and an output of the deep learning model is the projection position information. Thus, the human eye position information and the original position information are input to the trained deep learning model, and the corresponding projection position information are output based on the deep learning model.

Step 203, generating and rendering a projection picture of the target object model in the picture display region according to the plurality of pieces of projection position information.

It will be readily understood that to guarantee that the original position information of the associated three-dimensional points is presented on the projection position information on the picture display region, the corresponding projection position information need to be mapped to the corresponding three-dimensional points. Therefore, in the present embodiment, the projection picture of the target object model is generated and rendered in the picture display region according to the projection position information.

Figure 4:
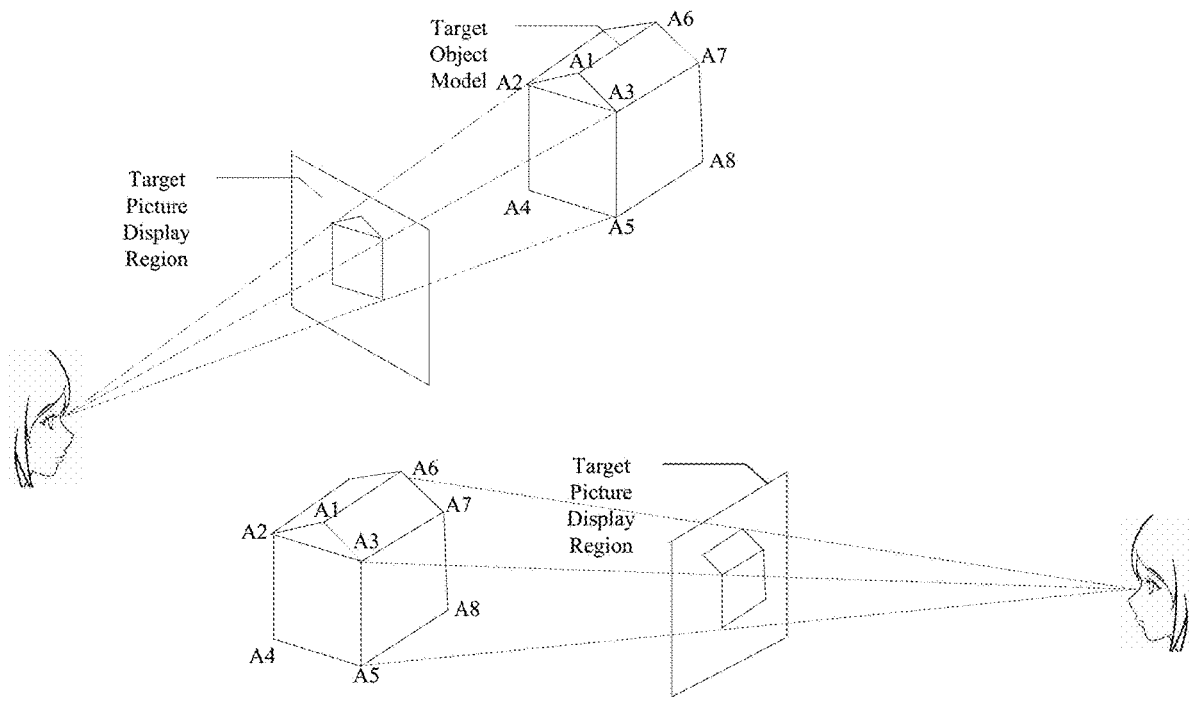
FIG. 4 is a flow schematic diagram of another displaying method for the three-dimensional object provided in an embodiment of the present disclosure.

For example, as shown in FIG. 4, when the target object model is a building, the determined associated three-dimensional points are A1-A5 as shown, and the corresponding projection position information are A1'-A5' (not shown) in the plane of the picture display region R. Apparently, for the human eye position information of the user, the projection picture rendered in the picture display region that is viewed by the user should be the image of the building region corresponding to A1-A5. Therefore, the image of the building region corresponding to A1-A5 is rendered according to A1'-A5'.

Continuously referring to FIG. 4, when the determined associated three-dimensional points are A1, A3, A5, A6, A7, and A8 as shown, the corresponding projection position information are A1', A3', A5', A6', A7', and A8' (not shown) in the picture display region. Apparently, for the human eye position information of the user, the image of the building region corresponding to A1, A3, A5, A6, A7, and A8 is seen by the user. Therefore, the image of the building region corresponding to A1, A3, A5, A6, A7, and A8 is rendered according to A1', A3', A5', A6', A7', and A8'.

Thus, determining the viewed object region of the target object model according to the human eye position information is realized, the projection picture corresponding to the corresponding object region is displayed in the picture display region, and an stereoscopic effect of adjusting the presentation angle of the target object model by following the user's eye position is achieved. It may also be understood that the target object model is construed as a "hole" and the picture display region as an "opening of the hole", and a picture viewed by the human eye is perceived by the projection picture of the "opening of the hole". Therefore, only the angle of the projection picture of the "opening of the hole" needs to be adjusted so that stereoscopic perception can be presented for the human eye. Such a three-dimensional display method has at least the following effects:

First, visual feedbacks are made according to a position of the human eye, and matching stereoscopic effect of viewing adaptive to the user's eye position is achieved.

Second, the orientation correlation of the display device in where the picture display region located is low. Since related position coordinates such as the human eye position information are consistent with the locating coordinate system of the display device, the achievement of the three-dimensional display effect may not be affected no matter how the display device is placed, and the pressure of calculation is reduced.

Third, the cost is low and no auxiliary device such as polarized glasses is needed.

Fourth, the display of the projection picture is merely related to the human eye position and unrelated to sight line direction of the human eye. Therefore, regardless of the direction of the sight line of the user, the display of the projection picture will not be affected, and the pressure of rendering and calculation is reduced.

In conclusion, according to the displaying method for the three-dimensional object in the embodiment of the present disclosure, the projection picture position information of the target object model is generated and rendered in the picture display region according to a plurality of pieces of projection position information, and a plurality of pieces of projection position information of a plurality of associated three-dimensional points on the picture display region are determined according to a plurality of pieces of original position information, the human eye position information, and the display position information. The projection picture of the target object model is then generated and rendered in the picture display region according to the plurality of pieces of projection position information. Thus, the projection pictures of the target object model at different angles are displayed by following the position of the human eye, the stereoscopic interaction of the human eye position with the display of the target object model is improved with no need for adding an external auxiliary device, and a low-cost three-dimensional picture display effect is achieved.

Since the projection pictures need to be generated by following the human eye positions to realize the stereoscopic perception in the present embodiment, it is crucial to acquire the human eye position information reflecting the human eye position.

Figure 5:
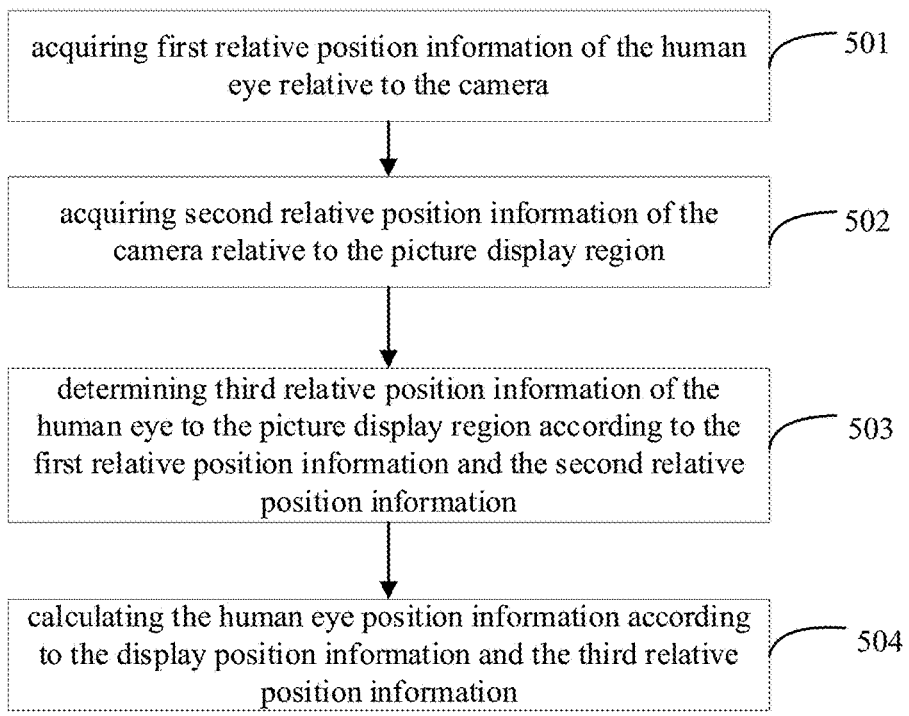
FIG. 5 is a flow schematic diagram of another displaying method for the three-dimensional object provided in an embodiment of the present disclosure.

It needs to be noted that the ways of acquiring the human eye position information of the human eye are different in different application scenarios, as shown in the following examples:

In one embodiment of the present disclosure, as shown in FIG. 5, when the picture display device includes a camera thereon, acquiring human eye position information of the human eye includes:

Step 501, acquiring first relative position information of the human eye relative to the camera.

In the present embodiment, if the display device is equipped with the camera, the first position information of the human eye is perceived using the camera.

In the present embodiment, human eye image may be shot by the camera and human eye pixel coordinates of the human eye image (the human eye here may be the position between the left eye and the right eye, or any one of the left eye and the right eye) are extracted. The shot human eye pixel coordinates are transformed into the corresponding first relative position information based on a camera parameter matrix of the camera.

In the present embodiment, a human face image of the head having the human eye may also be shot by the camera, fourth position information of the human eye relative to the human face is acquired, the human face image shot by the camera is acquired, and calculation is performed on the human face image according to a preset algorithm to acquire fifth position information of the human face image relative to the camera. The first relative position information of the human eye relative to the camera is calculated according the fourth position information and the fifth position information, wherein the preset algorithm may be a human face detection algorithm facedetect algorithm and the like.

Step 502, acquiring second relative position information of the camera relative to the picture display region.

Figure 6:
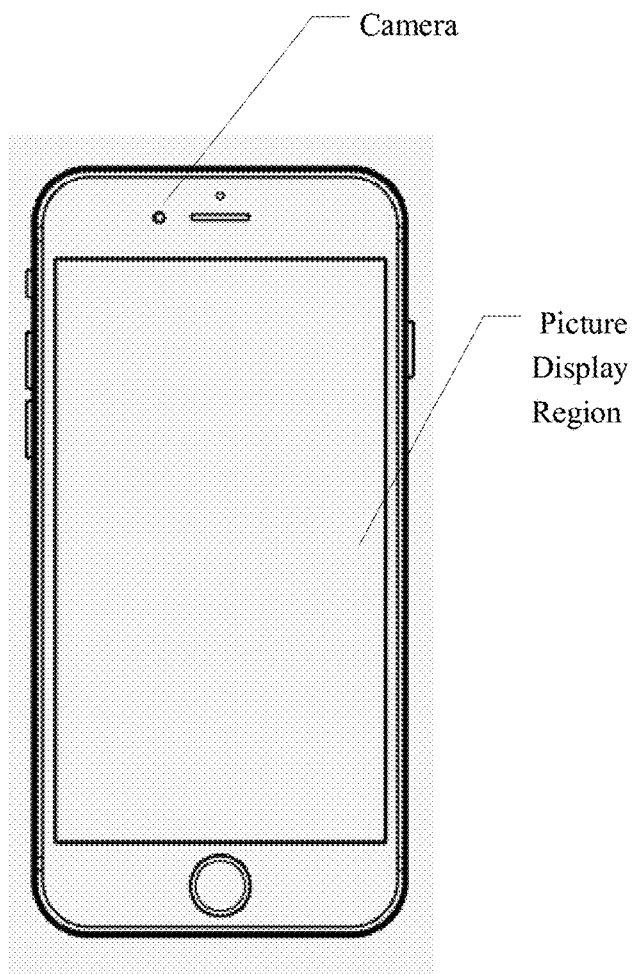
FIG. 6 is a schematic diagram of a setting scenario of a camera provided in an embodiment of the present disclosure.

In the present embodiment, since the camera and the picture display region are not at the same position, for example, as shown in FIG. 6, the camera may be potentially set on an upper side relative to the picture display region. Therefore, to further guarantee the accuracy of locating the human eye, the second relative position information of the camera relative to the picture display region is further acquired.

In some possible embodiments, the second position information may be stored at a preset position in advance during production. Thus, the corresponding second relative position information is read from the preset position, or the corresponding second relative position information may be obtained by shooting an image of the display device by other camera and performing calculation based on an image recognition algorithm.

Step 503, determining third relative position information of the human eye to the picture display region according to the first relative position information and the second relative position information.

Figure 7:
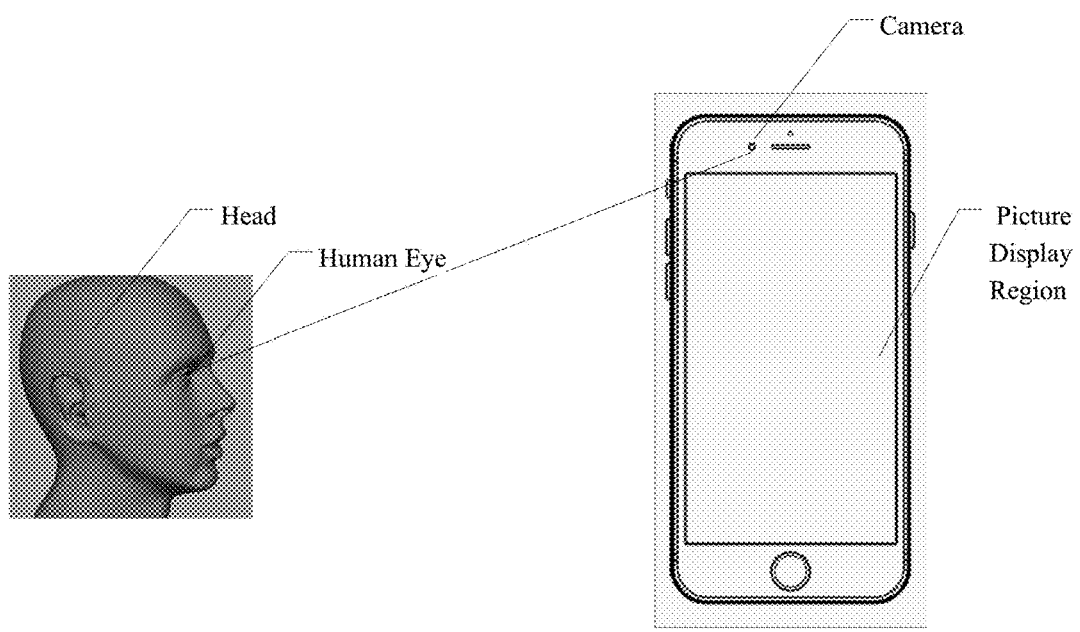
FIG. 7 is a schematic diagram of human eye position locating scenario provided in an embodiment of the present disclosure.

As shown in FIG. 7, if the human head having the human eye is regarded as a head model, the camera is mounted on a virtual display device, and then the orientation of the head model is driven by the camera. Thus, the head model, the human eye, the camera, and the picture display region on the display device form a stable relationship. That is, the human eye-human head relationship is the first relative position information, the camera-picture display region relationship is the second relative position information, and the human head-front camera is the third relative position information. A final objective may be obtained based on the above-mentioned relationships: i.e., the relative position information of the human eye located between the human eye and the picture display region.

In another embodiment of the present disclosure, a two-dimensional human eye image and a depth value may be acquired in the picture display region by a device such as an external camera based on the structured light technology or the infrared sensor technology and the like. After two-dimensional pixels in the two-dimensional human eye image are subjected to coordinate system transformation based on the camera parameter transform matrix of the external camera, the third relative human eye position information is determined in combination with the depth value.

Step 504, calculating the human eye position information according to the display position information and the third relative position information.

In the present embodiment, the third relative position information is the relative position information relative to the picture display region. Therefore, to acquire the absolute human eye position information of the human eye, the human eye position information needs to be calculated according to the display position information and the third relative position information. Among them, any point such as a center point of the display position information can be used as a reference point to determine the human eye position information, which will not be limited here.

In one embodiment of the present disclosure, if the original position information and the display position information mentioned in the foregoing embodiments are located based on World Coordinate System, a position of the third relative position information at the display position information is directly determined as the human eye position information.

In one embodiment of the present disclosure, if the original position information and the display position information mentioned in the foregoing embodiments are not all located based on World Coordinate System, e.g., the original position information is located based on World Coordinate System and the display position information is located based on the orientation data of the display device, then the coordinate system alignment needs to be performed before the human eye position information is acquired.

In the present embodiment, a first coordinate system for locating the display position information is acquired, wherein the first coordinate system is pre-calibrated, and may be an orientation locating coordinate system of the display device and the like. A second coordinate system for locating a plurality of pieces of original position information is then acquired, wherein the second coordinate system is also pre-calibrated. Whether the first coordinate system is aligned with the second coordinate system is determined, i.e., whether the positions of the origins of coordinates of the first coordinate system and the second coordinate system are the same is determined, and whether unit metrics of coordinates are the same is determined. If not aligned, then the first coordinate system is aligned with the second coordinate system to obtain a target coordinate system. The target coordinate system may be the first coordinate system or the second coordinate system, and reference position information for the display position information under the target coordinate system is acquired. For example, when the target coordinate system is the first coordinate system where the display position is located, the target position information is directly determined as the reference position information; otherwise, the reference position information for the target position information under the target coordinate system is calculated according to a displacement between the origin of the first coordinate system and the origin of the target coordinate system and a ratio of unit length metrics, and so on. The position of the third relative position information at the reference position information is then determined as the human eye position information. In conclusion, according to the displaying method for the three-dimensional object in the embodiment of the present disclosure, picture rendering is performed based on the humane eye position information of the human eye relative to the picture display region. Position locating errors of the human eye and the human face or the human head and a position locating error of the camera relative to the picture display region are avoided. The accuracy of determining the human eye position information is further guaranteed.

As described above, the final effect presented in the human eye is decided by the projection picture. If the calculation quantity of the projection picture is large, it will apparently result in a delay in following while presenting the three-dimensional effect by following the human eye positions. Therefore, an embodiment of the present disclosure further provides a way of rendering the projection picture with high efficiency.

Figure 8:
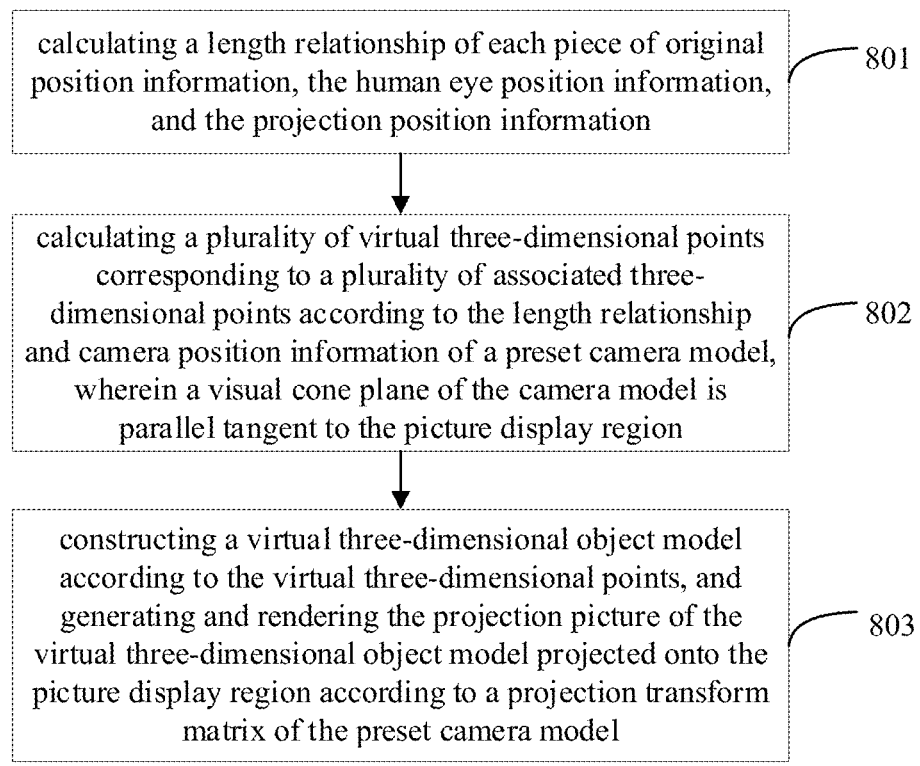
FIG. 8 is a flow schematic diagram of another displaying method for the three-dimensional object provided in an embodiment of the present disclosure.

In one embodiment of the present disclosure, as shown in FIG. 8, generating and rendering the projection picture of the target object model in the picture display region according to the projection position information includes:

Step 801, calculating a length relationship of each piece of original position information, the human eye position information, and the projection position information.

Step 802, calculating a plurality of virtual three-dimensional points corresponding to a plurality of associated three-dimensional points according to the length relationship and camera position information of a preset camera model, wherein a visual cone plane of the camera model is parallel tangent to the picture display region.

Figure 9A:
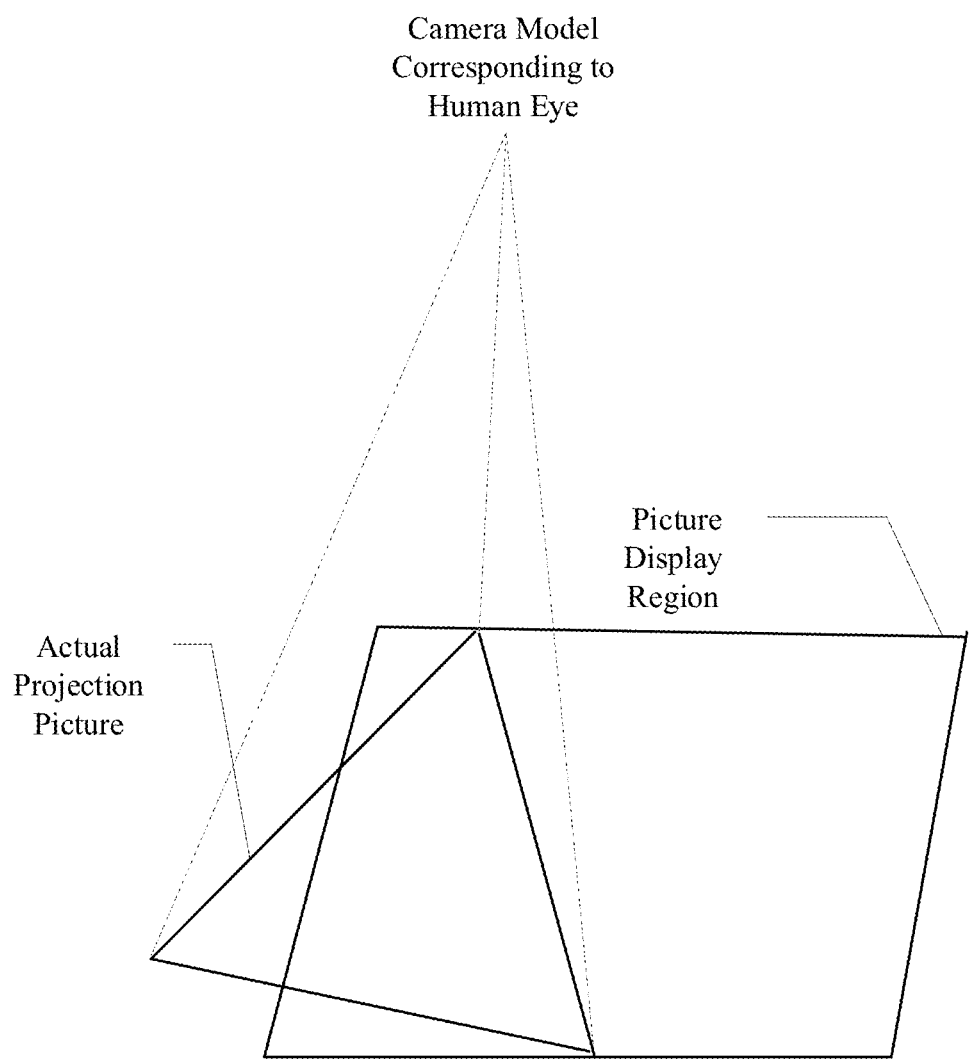
FIG. 9(a) is a schematic diagram of a projection scenario provided in an embodiment of the present disclosure.
Figure 9B:
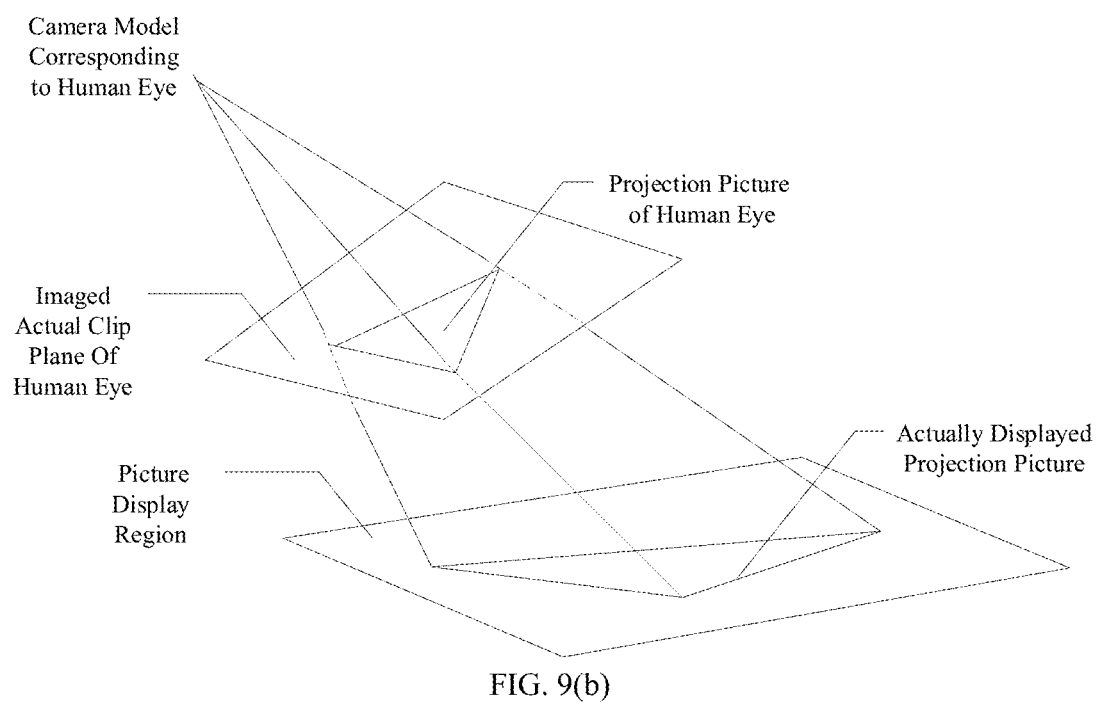
FIG. 9(b) is a schematic diagram of another projection scenario provided in an embodiment of the present disclosure.

It will be understood that the projection picture seen by the human eye is actually the projection picture of the target object model projected onto the "plane of the opening of the hole", namely a target display region. In the related technology, if the human eye is taken as a rendering visual cone point, it is impossible to directly set up a camera rendering model at the human eye position during actual implementation because a perspective matrix of the human eye is uncertain and the difficulty of implementation is high. If the camera model is forcibly set up at the human eye position, a visual cone angle may be affected by the human eye position. Thus, as shown in FIG. 9(a), the camera model is caused to fail to completely and correctly project the projection picture onto the plane of the opening of the hole, namely the picture display region, and meanwhile, the clip plane of the camera model established according to the human eye position is a rectangle perpendicular to the sight line direction. As shown in FIG. 9(b), if the plane of the opening of the hole is not parallel to and even forms a large angle with the clip plane of the camera model, a picture rendered by the camera may not be accurately transformed onto a display content in the plane of the opening of the hole, thereby affecting rendering effect and resulting in a distortion of the actually rendered projection picture.

Figure 10:
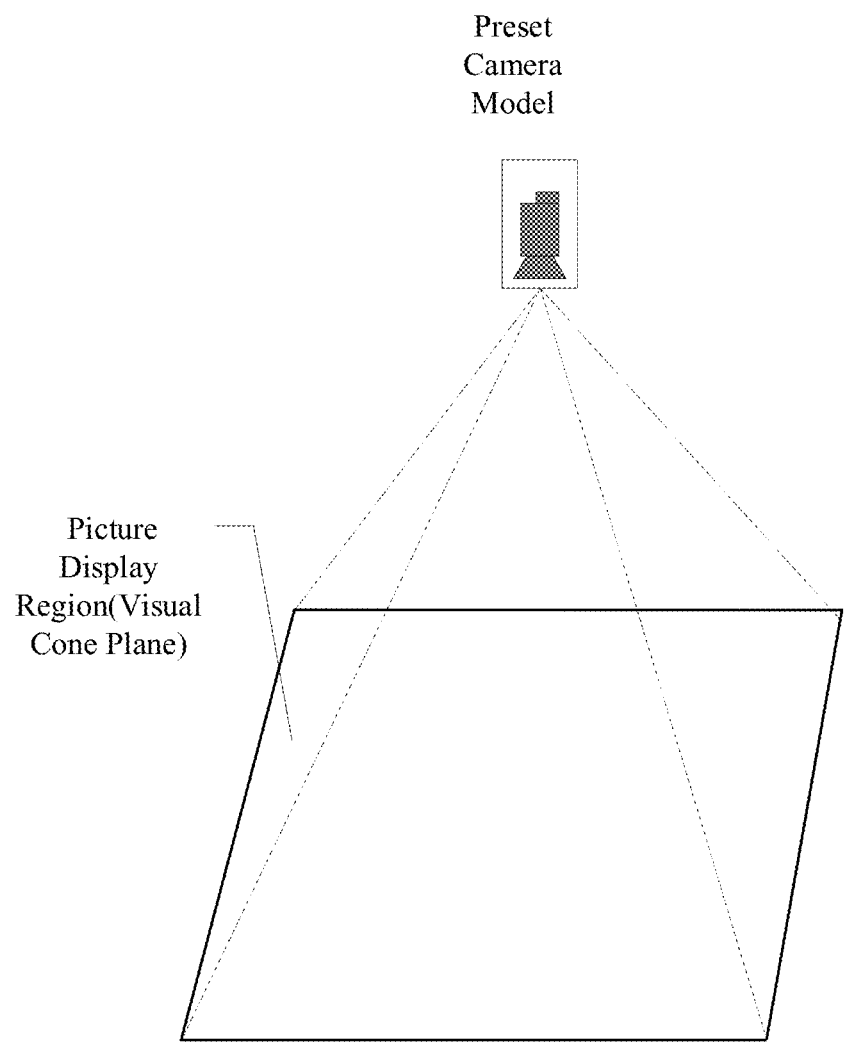
FIG. 10 is a schematic diagram of further another projection scenario provided in an embodiment of the present disclosure.

Therefore, in one embodiment of the present disclosure, to reduce the rendering difficulty and guarantee the rendering effect, a preset camera model is preset, which serves as the visual cone point for the rendering of the projection picture instead of the human eye. In some possible embodiments, to guarantee the rendering effect, as shown in FIG. 10, the visual cone plane of the camera model is parallel tangent to the picture display region, thereby guaranteeing that the picture rendered by the camera can be accurately transformed onto the display content in the plane of the opening of the hole, and the projection picture can be completely and correctly projected onto the plane of the opening of the hole.

To guarantee that the projection picture rendered by the preset camera model is consistent with the projection picture projected at the human eye position, it needs to be guaranteed that a rendering point of the projection picture of the target object model by the preset camera model in the target rendering region is consistent with the projection position information.

In the present embodiment, the length relationship of the original position information, the human eye position information, and the projection position information is calculated, and the virtual three-dimensional points of the associated three-dimensional points are calculated according to the length relationship and the camera position information of the present camera model, wherein the virtual three-dimensional points may be construed as virtual object points corresponding to the associated three-dimensional points in a virtual three-dimensional object constructed according to the preset camera model and corresponding to the target object model. When the target object model is a cube, as shown in FIG. 11, the virtual three-dimensional object may be a deformed cube, thereby guaranteeing that, for the preset camera model, points corresponding to the virtual three-dimensional points in the projection picture of the virtual three-dimensional object are located at the projection position information.

It needs to be noted that the length relationship of the original position information, the human eye position information, and the projection position information are different in different application scenarios. In some possible embodiments, a first length and a second length of the human eye position information to the original position information are calculated, respectively, and a ratio of the first length to the second length is calculated as the length relationship. A projection direction is then determined according to the camera position information and the projection position information. The projection direction is a straight line direction from the camera position information to the projection position information. A third length of the camera model to the projection position information is then determined in the projection direction; a product of the third length and the ratio is calculated to acquire a fourth length, and a position point having the fourth length to the camera position information in the projection direction is determined as a virtual three-dimensional point. The camera position information is pre-calibrated according to the target display region, and the camera position information is typically in a direction positively perpendicular to the target display region.

Figure 11:
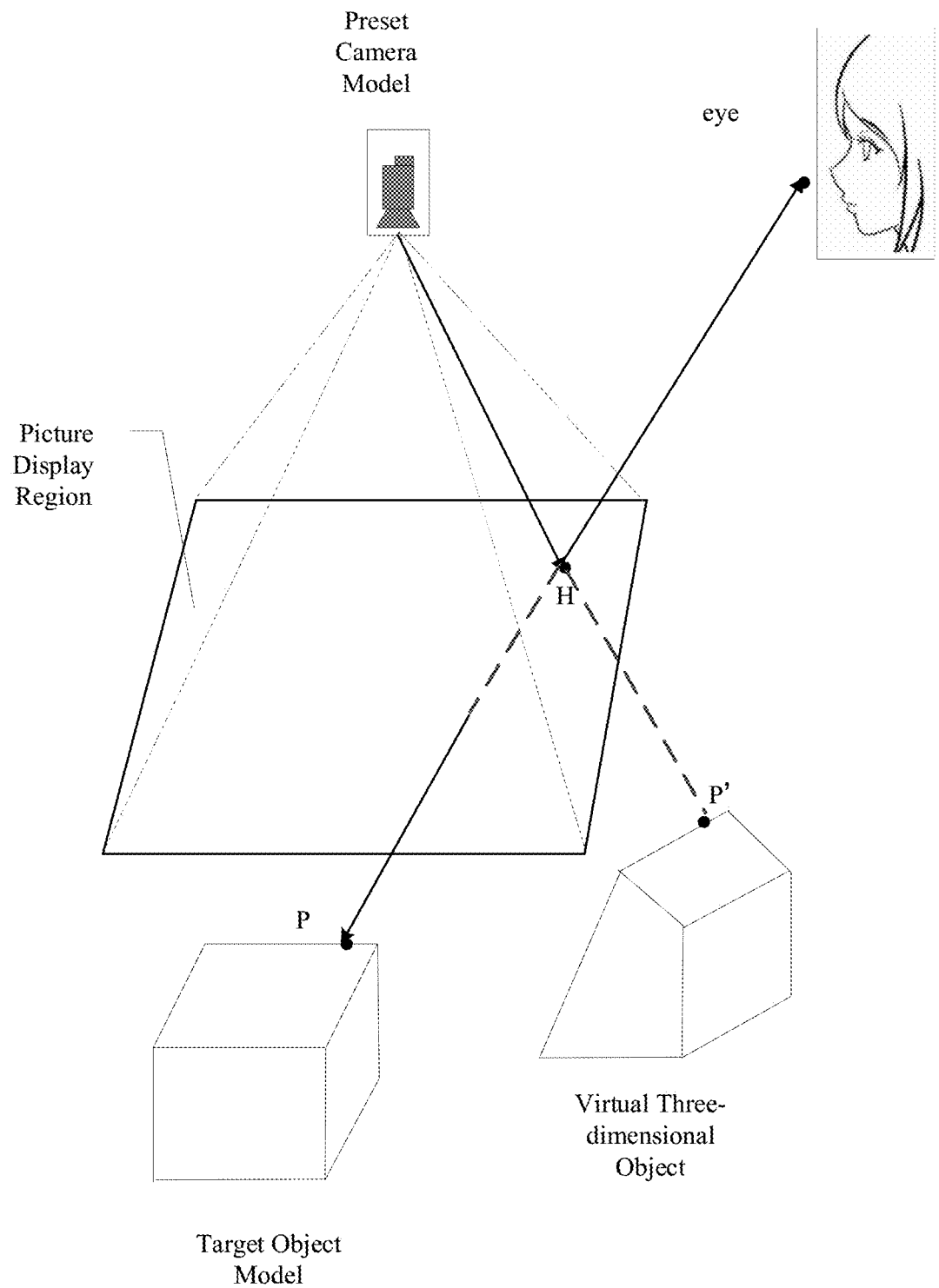
FIG. 11 is a schematic diagram of yet another projection scenario provided in an embodiment of the present disclosure.

For example, continuously referring to FIG. 11, when the target object model is a cube and the associated three-dimensional points in the cube include P, the projection position information of a straight line, corresponding to P and the human eye position information (eye) of the human eye, intersecting the target display region is H. Then, the first length of eye to P and the second length of eye to H are calculated, and the ratio of the first length to the second length is calculated as L. Based on the third length of the preset camera model VCAM to the projection position information H, a product of the third length and L is calculated, and a virtual three-dimensional point is determined as P' in the projection direction of the camera model VCAM and the projection position information H according to the product. The virtual three-dimensional point P' is a virtual image point of P, and a rendering result of P' by the preset camera model and a rendering result of P by the human eye are the same, i.e., both are H, and therefore, same rendering effect can be achieved.

Figure 12:
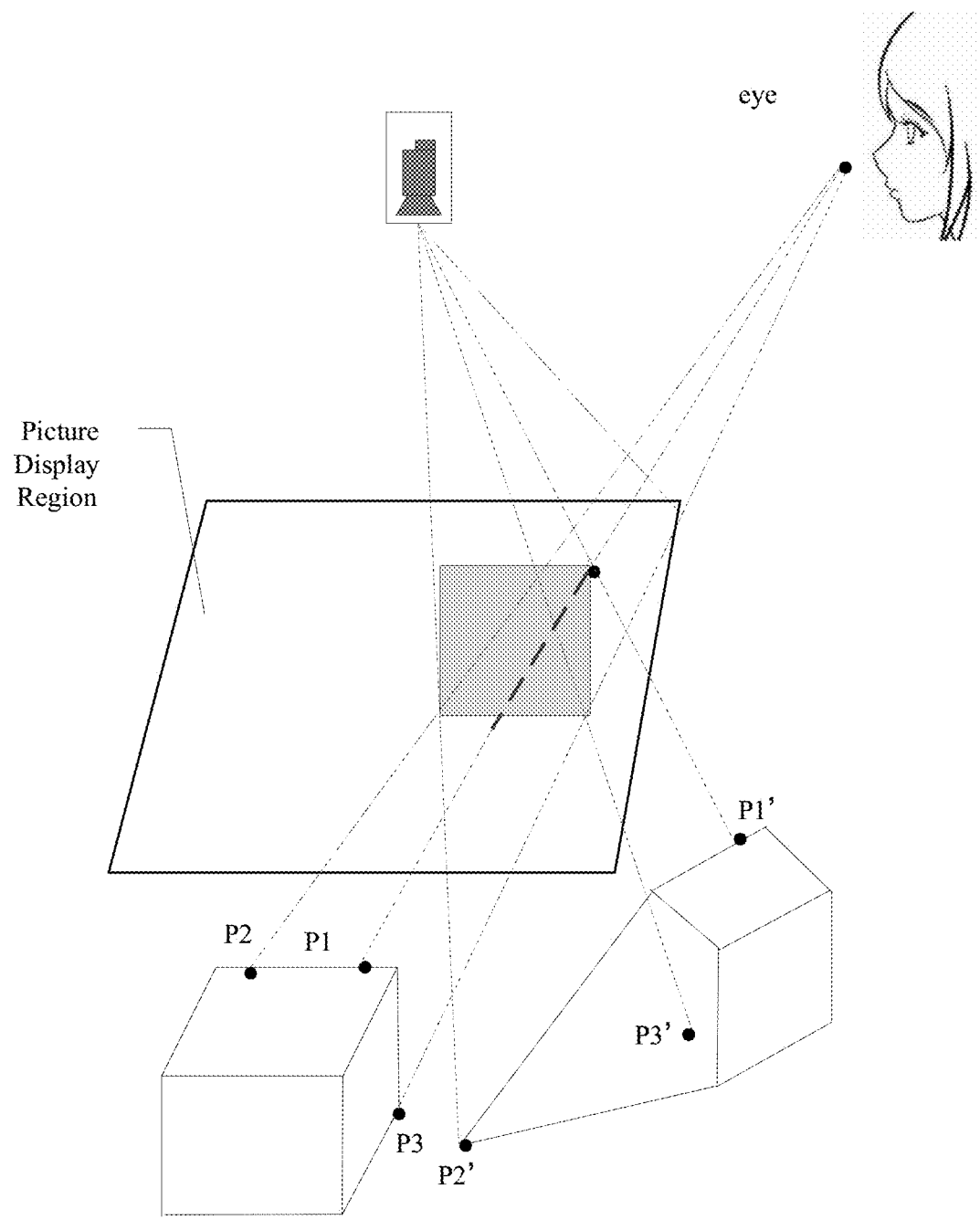
FIG. 12 is a schematic diagram of still another projection scenario provided in an embodiment of the present disclosure.

Thus, a length proportional relationship of the preset camera model to the projection position information to the virtual three-dimensional points is limited to be consistent with a length proportional relationship of the human eye to the projection position information to the corresponding virtual three-dimensional points. Accordingly, as shown in FIG. 12, according to the triangle similarity theorem of projection, it can be known that the corresponding projection pictures of the preset camera model and the human eye are the same. As shown, P1 and P1' are the associated three-dimensional point and the virtual three-dimensional point corresponding to each other; P2 and P2' are the associated three-dimensional point and the virtual three-dimensional point corresponding to each other; and P3 and P3' are the associated three-dimensional point and the virtual three-dimensional point corresponding to each other;

Step 803, constructing a virtual three-dimensional object model according to the virtual three-dimensional points, and generating and rendering the projection picture of the virtual three-dimensional object model projected onto the picture display region according to a projection transform matrix of the preset camera model.

In the present embodiment, as mentioned above, the virtual three-dimensional points are model points in the virtual object. Therefore, a virtual three-dimensional object is constructed according to the virtual three-dimensional points. The virtual three-dimensional object is not a mirror image model of the target object model, and instead, may be obtained by reverse deduction based on the rendering result by the human eye relative to the target object model, which may be a deformed object relative to the target object model.

In the present embodiment, the projection picture of the virtual three-dimensional object projected onto the target object model is generated and rendered according to the projection transform matrix of the preset camera model.

Thus, the projection picture is rendered and generated based on the camera model with the known projection transform matrix, and the operability of generating the projection picture is improved.

Figure 13:
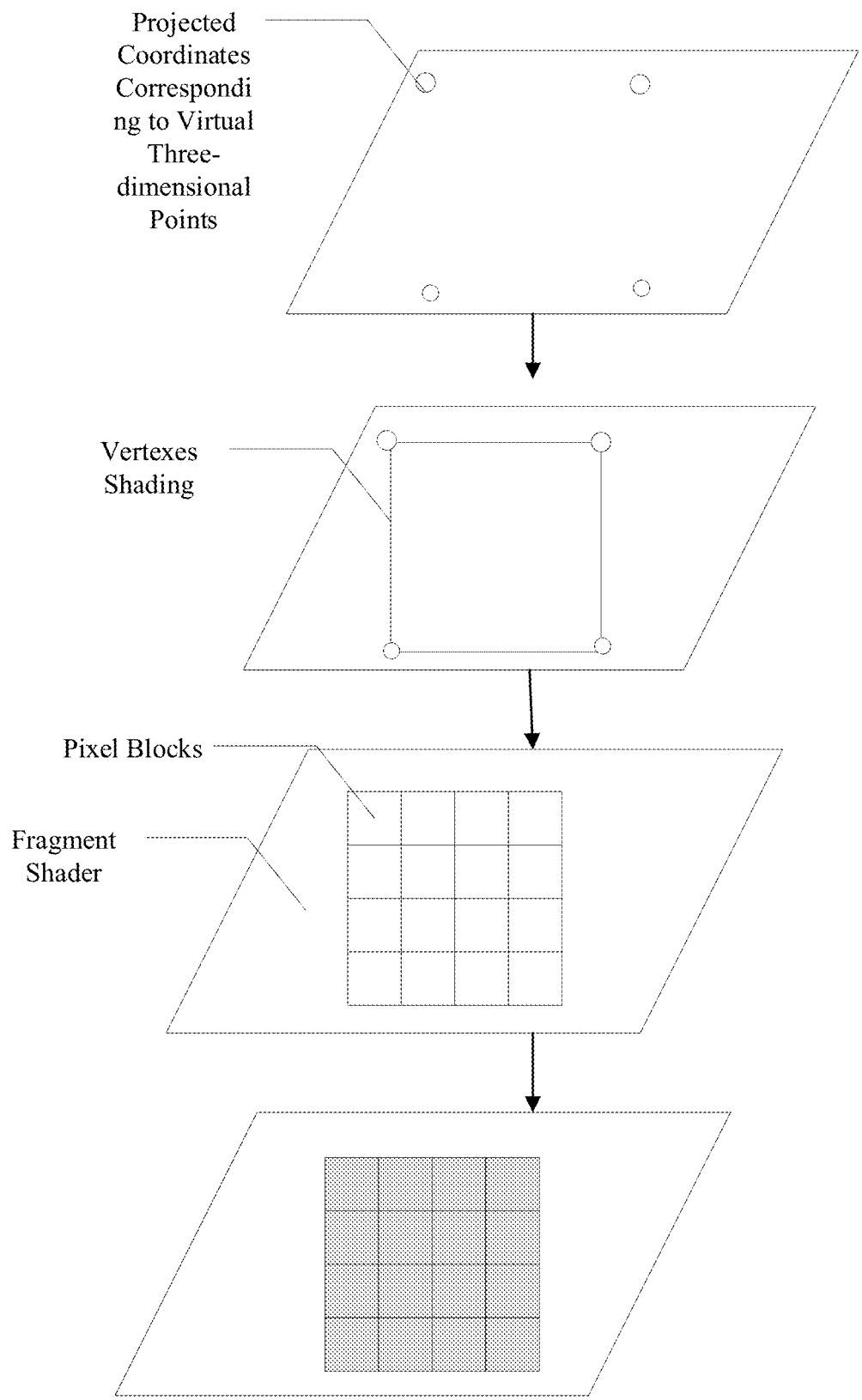
FIG. 13 is a schematic diagram of a rendering process of a projection picture provided in an embodiment of the present disclosure.

In some possible embodiments, generating the projection picture based on the projection transform matrix of the preset camera model may be implemented according to open graphics library (OpenGL) technology. In OpenGL technology, as shown in FIG. 13, the picture rendering is divided into two parts: one part is a vertex shader which is configured to firstly construct a picture shape of the projected region of the virtual three-dimensional object according to the projection transform matrix and the virtual three-dimensional points as vertexes; and the other part is a fragment shader which is configured to split the picture shape into small pixel blocks for pixel shading and finally render to obtain the desired projection picture.

For ease of understanding, the following description is made by way of example with possible OpenGL code for generating the projection picture based on the above-mentioned logic. In the following code, all coordinates are coordinates under a rectangular coordinate system;

varWorldPosition represents the original position information of the associated three-dimensional point; u_eyePos represents the human eye position information; u_panel represents a transform matrix from the position coordinates of the human eye to the corresponding human eye position information in the picture display region, and the transform matrix includes rotation, scaling, and displacement matrices; u_panelIny represents an inverse transform matrix; u_WorldSpaceCameraPos represents the camera position information; and p represents the associated three-dimensional point. The code snippet is as follows (it needs to be noted that, for ease of calculation, the following code snippet is different from the foregoing embodiment in, for example, that the projection position information point is calculated through the coordinate system of the plane of the opening of the hole, but the calculation logic should be construed as identical):

vec3 p_panel=(u_panelInv*vec4 (varWorldPosition, 1.0)) .xyz;//the virtual position information of p in virtual space (panel)=the inverse transform matrix of plane (panel)*the original position information of P;

vec3 eye_panel=(u_panelInv*vec4 (u_eyePos,1.0)).xyz;// the coordinates of the human eye in space (panel)=the inverse transform matrix of plane (panel)*the human eye position information;

float k=−eye_panel.z/(p_panel.z−eye_panel.z);//k=the length of the human eye to the projection position information point H/the length of the human eye to P=the length of the human eye to plane (panel)/the length difference of the human eye to P;

vec3 h_panel=eye_panel+(p_panel-eye_panel)*k;//Calculate the coordinates of the projection position information H in space (panel)=the coordinates of the human eye in space (panel)*(a vector from eye to P in space (panel))*ratio k;

vec3 h world=(u_panel*vec4(h_panel, 1.0)).xyz;//Calculate the world coordinates of H=the transform matrix of plane (panel)*the coordinates of H in space (panel);

vec3 p2_world=u_WorldSpaceCameraPos+(h_world-u_WorldSpaceCameraPos)/k;//Calculate the world coordinates of the virtual three-dimensional point P2=the camera model world coordinates (i.e., camera position information)+ (H world coordiantes—the camera position information)/K;

gl_Position=u_VP*vec4 (p2_world'1.0);//Calculate gl_Position in Clip Space=VP of the camera model (projection transform matrix of matrix view and projection)*the world coordinates of virtual three-dimensional point P2.

In the present embodiment, a camera model capable of orthographic projection relative to the picture display region is used to render the projection picture. On the basis of guaranteeing the reliability of the projection picture, the rendering calculation quantity of the projection picture is greatly reduced and the generation efficiency of the projection picture is improved.

Figure 14:
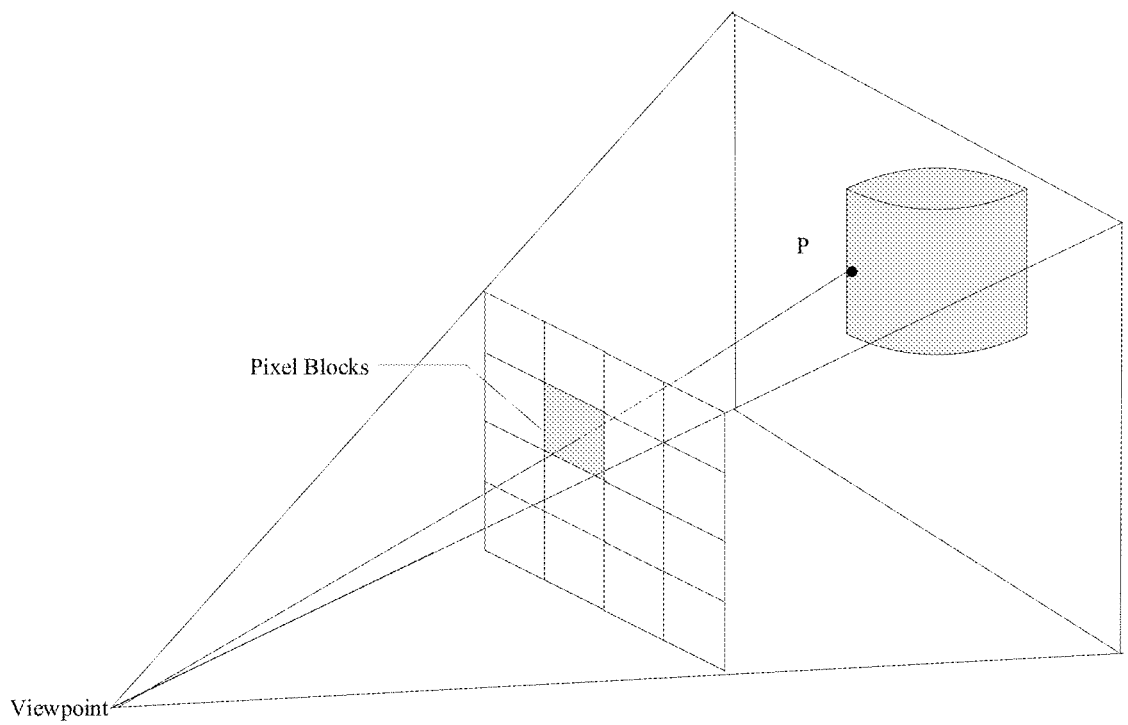
FIG. 14 is a schematic diagram of a rendering scenario of a light ray tracing provided in an embodiment of the present disclosure.

In another embodiment of the present disclosure, all light rays emitted from the human eye to the target object model are calculated employing a light ray tracing algorithm. The object model of the target object model associated with the projection picture is then determined based on the collision of light rays with a target three-dimensional model, and the object region is aligned to an intersecting region of the light rays emitted from the human eye with the target display region based on refractive and reflective calculation, etc. Specifically, as shown in FIG. 14, when the target object model is a cylinder, starting from a viewpoint of the human eye, one light ray R is emitted from the pixel center to the cylinder, and all intersection points of R with the cylinder in a scene are acquired, and the intersection point P closest to the viewpoint is acquired. A color value Ic at P is calculated according to a partial light illumination model. Light rays are derived from P in a mirror reflection direction and a transmission direction of R, respectively. The previous steps are recursively performed on the derived light rays; contributions Is and It of surroundings to brightness at the point P in the mirror reflection direction and the transmission direction are calculated, and the brightness at the point P can be calculated according to Whitted light illumination model, and the calculated brightness is assigned to the pixel blocks where the projection position information corresponding to the target display region is located. Finally, when all sight lines colliding with the target three-dimensional model and all pixel blocks intersecting the target display region are processed completely, one realistic projection picture can be acquired.

As a matter of course, in the present embodiment, as mentioned above, the position of the human eye may be at a large angle relative to the target display region. Therefore, the obtained projection picture further needs to be subjected to oblique projection processing. That is, oblique projection transformation processing is performed on the obtained projection picture orthographically projected relative to the position of the human eye in accordance with the angle between the human eye and the target display region. For the specific transformation way, see the oblique projection algorithm in the prior art, which will not be described here redundantly.

To sum up, the method displaying for the three-dimensional object in the embodiments of the present disclosure is not to render the projection picture directly based on the human eye position for which projection transformation parameters are difficult to determine, and instead, to perform equivalent projection picture rendering processing in other ways, thereby the generation difficulty of the projection picture is reduced and the generation efficiency of the projection picture is improved. Thus, real-time interaction between the human eye position and the three-dimensional picture of the target object model is achieved.

Based on the foregoing embodiments, the target object model region at an angle matching the human eye position is rendered based on the projection picture to achieve stereoscopic perception. In an actual three-dimensional stereoscopic viewing scenario, the reality of the stereoscopic perception is improved in other display manners in addition to the display angle of the target object model itself.

In one embodiment of the present disclosure, the reality of the stereoscopic perception is improved by adding shadow and the like.

Figure 15:
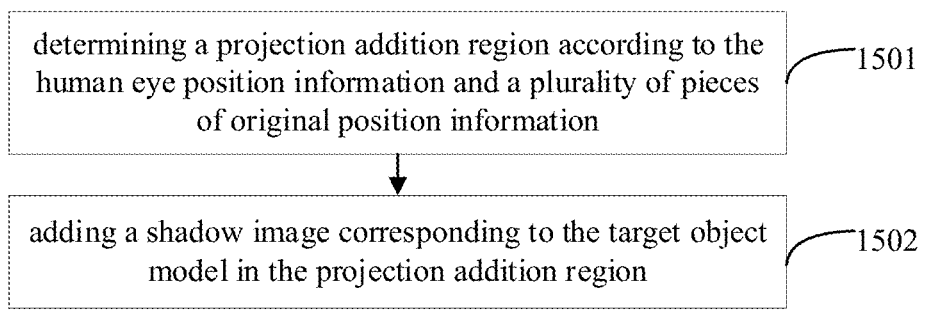
FIG. 15 is a flow schematic diagram of another displaying method for the three-dimensional object provided in an embodiment of the present disclosure.

As shown in FIG. 15, the method further includes:

Step 1501, determining a projection addition region according to the human eye position information and a plurality of pieces of original position information.

In the present embodiment, the projection addition region is determined according to the human eye position information and the original position information. For example, the position corresponding to the human eye position information may be regarded as a light ray source and the original position information may be regarded as an entity blocking light rays. Thus, to reflect a sense of blocking, the corresponding projection addition region is determined.

For example, a correspondence of different directions corresponding to the target object model and corresponding projection addition region is established in advance; a direction from the human eye position information to the original position information is constructed; and the corresponding projection addition region is determined by looking up the correspondence based on the direction.

Step 1502, adding a shadow image corresponding to the target object model in the projection addition region.

In the present embodiment, to improve the interestingness of displaying, the shadow image may correspond to the target object model. For example, when the target object model is a cube, the shadow image is a deep filling image to affect the shadow effect. For another example, when the target object model is a volcano model, the shadow image may be a "magma" image and the like.

Figure 16:
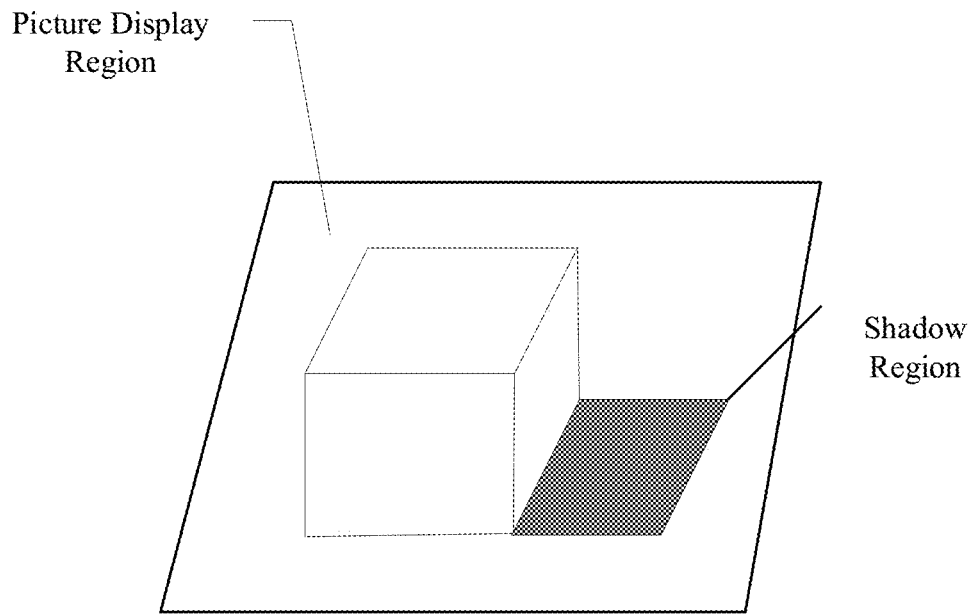
FIG. 16 is a schematic diagram of still another projection scenario provided in an embodiment of the present disclosure.

For example, as shown in FIG. 16, when the target object model is a cube, to improve the reality of the stereoscopic perception, after the projection addition region is determined according to the human eye position information and the original position information, shadow is added in the corresponding projection addition region to improve the reality of displaying.

In another embodiment of the present disclosure, to improve the reality of the stereoscopic perception and produce the visual stereoscopic effect, transparency processing may also be performed on pixel values of different pieces of projection position information according to depth values of the projection position information relative to the coordinates of the human eye, producing a stereoscopic visual effect of being clear at a short distance and fuzzy at a long distance.

Figure 17:
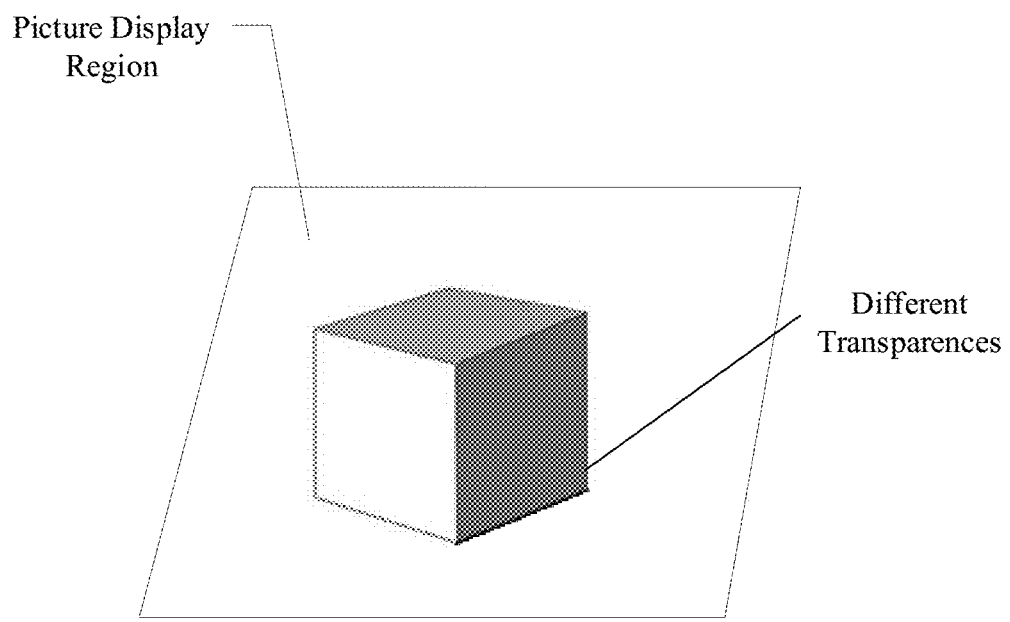
FIG. 17 is a schematic diagram of still another projection scenario provided in an embodiment of the present disclosure.

For example, as shown in FIG. 17, when the target object model is a cube, to improve the reality of the stereoscopic perception, the transparency of the pixel value of each piece of projection position information is determined according to a distance between the human eye position information and the associated three-dimensional point corresponding to the projection position information and a preset correspondence between a distance and a transparency. Thus, the rendered projection picture is displayed based on the hierarchical implementation of the sharpness of colors, and the visual stereoscopic perception is further improved.

In conclusion, the displaying method for the three-dimensional object in the embodiments of the present disclosure further improves the stereoscopic effect of displaying of the projection picture and enhances the three-dimensional viewing experience of the user by processing on display manners of the projection picture.

To implement the foregoing embodiments, the present disclosure further provides a displaying apparatus for a three-dimensional object.

Figure 18:
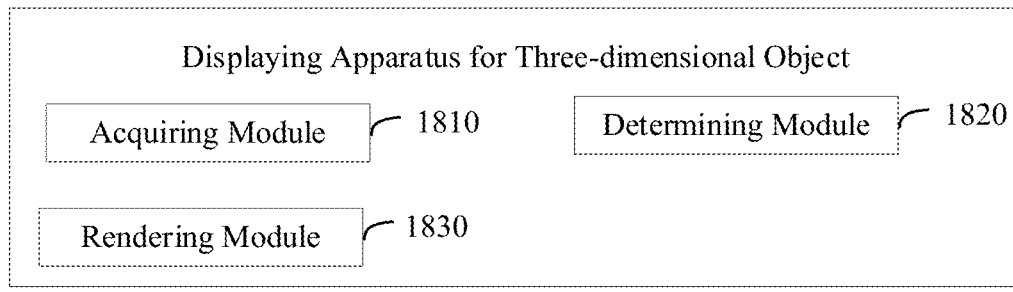
FIG. 18 is a structural schematic diagram of a displaying apparatus for a three-dimensional object provided in an embodiment of the present disclosure.

FIG. 18 is a structural schematic diagram of a displaying apparatus for a three-dimensional object provided in an embodiment of the present disclosure. The apparatus may be implemented by software and/or hardware and may be generally integrated in an electronic device. As shown in FIG. 18, the apparatus includes an acquiring module 1810, a determining module 1820, and a rendering module 1830.

The acquiring module 1810 is configured to acquire a plurality of pieces of original position information of a plurality of associated three-dimensional points in a target object model, acquire human eye position information of human eye, and acquire display position information of a preset picture display region in a picture display device.

The determining module 1820 is configured to determine a plurality of pieces of projection position information of the plurality of associated three-dimensional points on the picture display region according to the plurality of pieces of original position information, the human eye position information, and the display position information.

The rendering module 1830 is configured to generate and render a projection picture of the target object model in the picture display region according to the plurality of pieces of projection position information. The displaying apparatus for the three-dimensional object provided in the embodiment of the present disclosure may perform the method for displaying a three-dimensional object provided in any embodiment of the present disclosure and has corresponding functional modules for performing the method and beneficial effects.

To implement the foregoing embodiments, the present disclosure further provides a computer program product, including a computer program/instructions, where when the computer program/instructions is/are executed by a processor, the displaying method for a three-dimensional object described in the foregoing embodiments is implemented.

Figure 19:
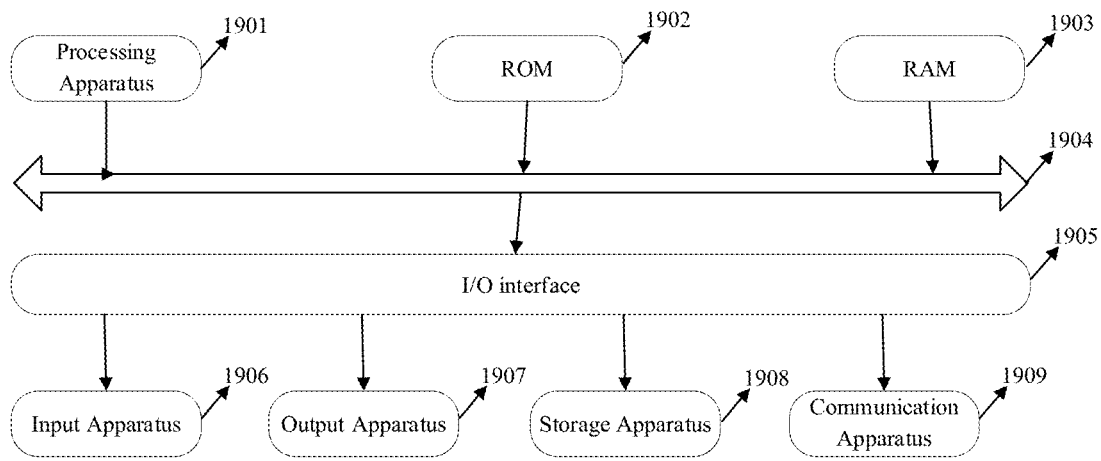
FIG. 19 is a structural schematic diagram of an electronic device provided in an embodiment of the present disclosure.

FIG. 19 is a structural schematic diagram of an electronic device provided in an embodiment of the present disclosure.

FIG. 19 is specifically referred below, and it shows the structure schematic diagram suitable for achieving the electronic device 1900 in the embodiment of the present disclosure. The electronic device 1900 in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 19 is only an example and should not impose any limitations on the functions and use scopes of the embodiments of the present disclosure.

As shown in FIG. 19, the electronic device 1900 may include a processing apparatus (such as a central processing unit, and a graphics processor) 1901, it may execute various appropriate actions and processes according to a program stored in a read-only memory (ROM) 1902 or a program loaded from a storage apparatus 1908 to a random access memory (RAM) 1903. In RAM 1903, various programs and data required for operations of the electronic device 1900 are also stored. The processing apparatus 1901, ROM 1902, and RAM 1903 are connected to each other by a bus 1904. An input/output (I/O) interface 1905 is also connected to the bus 1904.

Typically, the following apparatuses may be connected to the I/O interface 1905: an input apparatus 1906 such as a touch screen, a touchpad, a keyboard, a mouse, a camera, a microphone, an accelerometer, and a gyroscope; an output apparatus 1907 such as a liquid crystal display (LCD), a loudspeaker, and a vibrator; a storage apparatus 1908 such as a magnetic tape, and a hard disk drive; and a communication apparatus 1909. The communication apparatus 1909 may allow the electronic device 1900 to wireless-communicate or wire-communicate with other devices so as to exchange data. Although FIG. 19 shows the electronic device 1900 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 1909, or installed from the storage apparatus 1908, or installed from ROM 1902. When the computer program is executed by the processing apparatus 1901, the above functions defined in the displaying method for the three-dimensional object in the embodiments of the present disclosure are executed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

The above-mentioned computer-readable medium may carry one or more programs which, when executed by the electronic device, cause the electronic device to:
acquire a plurality of pieces of original position information of a plurality of associated three-dimensional points in a target object model, acquire human eye position information of human eye, and acquire display position information of a preset picture display region in a picture display device; then determine a plurality of pieces of projection position information of the plurality of associated three-dimensional points on the picture display region according to the plurality of pieces of original position information, the human eye position information, and the display position information; and generate and render a projection picture of the target object model in the picture display region according to the plurality of pieces of projection position information. Thus, the projection pictures of the target object model at different angles are displayed by following the positions of the human eye; the stereoscopic interaction of the human eye positions with the display of the target object model is improved, and a low-cost three-dimensional picture display effect is achieved without the need of adding an external auxiliary device.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, the present disclosure provides a displaying method for a three-dimensional object, comprising:
  acquiring a plurality of pieces of original position information of a plurality of associated three-dimensional points in a target object model, acquiring human eye position information of human eye, and acquiring display position information of a preset picture display region in a picture display device;
  determining a plurality of pieces of projection position information of the plurality of associated three-dimensional points on the picture display region according to the plurality of pieces of original position information, the human eye position information, and the display position information; and
  generating and rendering a projection picture of the target object model in the picture display region according to the plurality of pieces of projection position information.

According to one or more embodiments of the present disclosure, in the displaying method for a three-dimensional object provided by the present disclosure,
  when the picture display device comprises a camera thereon, acquiring human eye position information of human eye comprises:
  acquiring first relative position information of the human eye relative to the camera;
  acquiring second relative position information of the camera relative to the picture display region;
  determining third relative position information of the human eye to the picture display region according to the first relative position information and the second relative position information; and
  calculating the human eye position information according to the display position information and the third relative position information.

According to one or more embodiments of the present disclosure, in the displaying method for a three-dimensional object provided by the present disclosure,
  acquiring first relative position information of the human eye relative to the camera comprises:
  acquiring fourth relative position information of the human eye relative to a human face;
  acquiring a human face image shot by the camera, and performing calculation on the human face image according to a preset algorithm to obtain fifth relative position information of the human face image relative to the camera; and
  calculating the first relative position information according to the fourth relative position information and the fifth relative position information.

According to one or more embodiments of the present disclosure, in the displaying method for a three-dimensional object provided by the present disclosure, calculating the human eye position information according to the display position information and the third relative position information comprises:
  acquiring a first coordinate system for locating the display position information, and obtaining a second coordinate system for locating the plurality of pieces of original position information;
  determining whether the first coordinate system is aligned with the second coordinate system;
  if not aligned, aligning the first coordinate system and the second coordinate system to acquire a target coordinate system; and
  acquiring reference position information for the display position information under the target coordinate system, and determining a position of the third relative position information at the reference position information as the human eye position information.

According to one or more embodiments of the present disclosure, in the displaying method for a three-dimensional object provided by the present disclosure,
  determining a plurality of pieces of projection position information of the plurality of associated three-dimensional points on the picture display region according to the plurality of pieces of original position information, the human eye position information, and the display position information comprises:
  constructing connecting straight lines of the human eye position information and each piece of original position information; and
  determining intersection points of the connecting straight lines of the plurality of pieces of original position information and the display position information as the plurality of pieces of projection position information.

According to one or more embodiments of the present disclosure, in the displaying method for a three-dimensional object provided by the present disclosure, generating and rendering a projection picture of the target object model in the picture display region according to the plurality of pieces of projection position information comprises:

calculating a length relationship of each piece of original position information, the human eye position information, and the projection position information;

calculating a plurality of virtual three-dimensional points corresponding to the plurality of associated three-dimensional points according to the length relationship and camera position information of a preset camera model, wherein a visual cone plane of the camera model is parallel tangent to the picture display region; and constructing a virtual three-dimensional object model according to the virtual three-dimensional points, and generating and rendering the projection picture of the virtual three-dimensional object model projected onto the picture display region according to a projection transform matrix of the preset camera model.

According to one or more embodiments of the present disclosure, in the displaying method for a three-dimensional object provided by the present disclosure, calculating a length relationship of each piece of original position information, the human eye position information, and the projection position information comprises:

calculating a first length and a second length of the human eye position information to each piece of original position information and the corresponding projection position information, respectively; and calculating a ratio of the first length to the second length as the length relationship.

According to one or more embodiments of the present disclosure, in the displaying method for a three-dimensional object provided by the present disclosure, calculating a plurality of virtual three-dimensional points corresponding to the plurality of associated three-dimensional points according to the length relationship and camera position information of a preset camera model comprises:

determining a projection direction according to the camera position information and each piece of projection position information;

determining a third length between the camera position information and the corresponding projection position information in the projection direction; and calculating a product of the third length and the ratio to acquire a fourth length, and determining position points having the fourth length to the camera position information in the projection direction as the virtual three-dimensional points.

According to one or more embodiments of the present disclosure, in the displaying method for a three-dimensional object provided by the present disclosure, further comprising:

determining a projection addition region according to the human eye position information and the plurality of pieces of original position information; and adding a shadow image corresponding to the target object model in the projection addition region.

According to one or more embodiments of the present disclosure, the present disclosure provides a displaying apparatus for a three-dimensional object, comprising:

an acquiring module configured to acquire a plurality of pieces of original position information of a plurality of associated three-dimensional points in a target object model, acquire human eye position information of human eye, and acquire display position information of a preset picture display region in a picture display device;

a determining module configured to determine a plurality of pieces of projection position information of the plurality of associated three-dimensional points on the picture display region according to the plurality of pieces of original position information, the human eye position information, and the display position information; and a rendering module configured to generate and render a projection picture of the target object model in the picture display region according to the plurality of pieces of projection position information.

According to one or more embodiments of the present disclosure, in the displaying apparatus for a three-dimensional object provided by the present disclosure, when the picture display device comprises a camera thereon, the acquiring module is configured to in specific:

acquiring first relative position information of the human eye relative to the camera;

acquiring second relative position information of the camera relative to the picture display region;

determining third relative position information of the human eye to the picture display region according to the first relative position information and the second relative position information; and calculating the human eye position information according to the display position information and the third relative position information.

According to one or more embodiments of the present disclosure, in the displaying apparatus for a three-dimensional object provided by the present disclosure, the acquiring module is configured to in specific:

acquiring first relative position information of the human eye relative to the camera comprises:

acquiring fourth relative position information of the human eye relative to a human face;

acquiring a human face image shot by the camera, and performing calculation on the human face image according to a preset algorithm to obtain fifth relative position information of the human face image relative to the camera; and calculating the first relative position information according to the fourth relative position information and the fifth relative position information.

According to one or more embodiments of the present disclosure, in the displaying apparatus for a three-dimensional object provided by the present disclosure, the determining module is configured to in specific:

calculating the human eye position information according to the display position information and the third relative position information comprises:

acquiring a first coordinate system for locating the display position information, and obtaining a second coordinate system for locating the plurality of pieces of original position information;

determining whether the first coordinate system is aligned with the second coordinate system;

if not aligned, aligning the first coordinate system and the second coordinate system to acquire a target coordinate system; and acquiring reference position information for the display position information under the target coordinate system, and determining a position of the third relative position information at the reference position information as the human eye position information.

According to one or more embodiments of the present disclosure, in the displaying apparatus for a three-dimensional object provided by the present disclosure, the determining module is configured to in specific:

determining a plurality of pieces of projection position information of the plurality of associated three-dimensional points on the picture display region according to the plurality of pieces of original position information, the human eye position information, and the display position information comprises:

constructing connecting straight lines of the human eye position information and each piece of original position information; and determining intersection points of the connecting straight lines of the plurality of pieces of original position information and the display position information as the plurality of pieces of projection position information.

According to one or more embodiments of the present disclosure, in the displaying apparatus for a three-dimensional object provided by the present disclosure, the rendering module comprises:

a first calculating unit configured to calculating a length relationship of each piece of original position information, the human eye position information, and the projection position information;

a second calculating unit configured to calculating a plurality of virtual three-dimensional points corresponding to the plurality of associated three-dimensional points according to the length relationship and camera position information of a preset camera model, wherein a visual cone plane of the camera model is parallel tangent to the picture display region; and a rendering unit configured to constructing a virtual three-dimensional object model according to the virtual three-dimensional points, and generating and rendering the projection picture of the virtual three-dimensional object model projected onto the picture display region according to a projection transform matrix of the preset camera model.

According to one or more embodiments of the present disclosure, in the displaying apparatus for a three-dimensional object provided by the present disclosure, the first calculating unit is configured to in specific:

calculating a length relationship of each piece of original position information, the human eye position information, and the projection position information comprises:

calculating a first length and a second length of the human eye position information to each piece of original position information and the corresponding projection position information, respectively; and calculating a ratio of the first length to the second length as the length relationship.

According to one or more embodiments of the present disclosure, in the displaying apparatus for a three-dimensional object provided by the present disclosure, the second calculating unit is configured to in specific:

calculating a plurality of virtual three-dimensional points corresponding to the plurality of associated three-dimensional points according to the length relationship and camera position information of a preset camera model comprises:

determining a projection direction according to the camera position information and each piece of projection position information;

determining a third length between the camera position information and the corresponding projection position information in the projection direction; and calculating a product of the third length and the ratio to acquire a fourth length, and determining position points having the fourth length to the camera position information in the projection direction as the virtual three-dimensional points.

According to one or more embodiments of the present disclosure, in the displaying apparatus for a three-dimensional object provided by the present disclosure, further comprising:

determining a projection addition region according to the human eye position information and the plurality of pieces of original position information; and adding a shadow image corresponding to the target object model in the projection addition region.

According to one or more embodiments of the present disclosure, the present disclosure provides an electronic device, comprising:

a processor; and a memory configured to store instructions executable by the processor, wherein the processor is configured to read the executable instructions from the memory and execute the instructions to implement any one of the displaying methods for a three-dimensional object provided by the disclosed embodiments.

According to one or more embodiments of the present disclosure, the present disclosure provides a computer-readable storage medium, storing a computer program configured to perform any one of the displaying methods for a three-dimensional object provided by the disclosed embodiments.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A displaying method for a three-dimensional object, comprising steps of:
   acquiring a plurality of pieces of original position information of a plurality of associated three-dimensional points in a target object model, acquiring human eye position information of human eye, and acquiring display position information of a preset picture display region in a picture display device;
   determining a plurality of pieces of projection position information of the plurality of associated three-dimensional points on the preset picture display region according to the plurality of pieces of the original position information, the human eye position information, and the display position information, wherein the projection position information is projection position information points of the plurality of associated three-dimensional points that are viewed according to the human eye position information and projected onto the preset picture display region when transferred in a sight line light path; and
   generating and rendering a projection picture of the target object model in the preset picture display region according to the plurality of pieces of projection position information,
   wherein determining the plurality of pieces of projection position information of the plurality of associated three-dimensional points on the preset picture display region according to the plurality of pieces of original position information, the human eye position information, and the display position information comprises:
   constructing connecting straight lines of the human eye position information and each piece of original position information; and
   determining intersection points of the connecting straight lines of the plurality of pieces of original position information and the display position information as the plurality of pieces of projection position information.

2. The method according to claim 1, wherein when the picture display device comprises a camera thereon, acquiring the human eye position information of the human eye comprises:
   acquiring first relative position information of the human eye relative to the camera;
   acquiring second relative position information of the camera relative to the preset picture display region;
   determining third relative position information of the human eye to the preset picture display region according to the first relative position information and the second relative position information; and
   calculating the human eye position information according to the display position information and the third relative position information.

3. The method according to claim 2, wherein acquiring the first relative position information of the human eye relative to the camera comprises:
   acquiring fourth relative position information of the human eye relative to a human face;
   acquiring a human face image shot by the camera, and performing calculation on the human face image according to a preset algorithm to obtain fifth relative position information of the human face image relative to the camera; and
   calculating the first relative position information according to the fourth relative position information and the fifth relative position information.

4. The method according to claim 2, wherein calculating the human eye position information according to the display position information and the third relative position information comprises:
   acquiring a first coordinate system for locating the display position information, and obtaining a second coordinate system for locating the plurality of pieces of original position information;
   determining whether the first coordinate system is aligned with the second coordinate system;
   if not aligned, aligning the first coordinate system and the second coordinate system to acquire a target coordinate system; and
   acquiring reference position information for the display position information under the target coordinate system, and determining a position of the third relative position information at the reference position information as the human eye position information.

5. The method according to claim 1, wherein generating and rendering the projection picture of the target object model in the preset picture display region according to the plurality of pieces of projection position information comprises:
   calculating a length relationship of each piece of original position information, the human eye position information, and the projection position information;
   calculating a plurality of virtual three-dimensional points corresponding to the plurality of associated three-dimensional points according to the length relationship and camera position information of a preset camera model, wherein a visual cone plane of the preset camera model is parallel tangent to the preset picture display region; and
   constructing a virtual three-dimensional object model according to the plurality of virtual three-dimensional points, and generating and rendering the projection picture of the virtual three-dimensional object model projected onto the preset picture display region according to a projection transform matrix of the preset camera model.

6. The method according to claim 5, wherein calculating the length relationship of each piece of original position information, the human eye position information, and the projection position information comprises:
   calculating a first length and a second length of the human eye position information to each piece of original position information and the corresponding projection position information, respectively; and
   calculating a ratio of the first length to the second length as the length relationship.

7. The method according to claim 6, wherein calculating the plurality of virtual three-dimensional points corresponding to the plurality of associated three-dimensional points according to the length relationship and camera position information of a preset camera model comprises:

determining a projection direction according to the camera position information and each piece of projection position information;

determining a third length between the camera position information and the corresponding projection position information in the projection direction; and calculating a product of the third length and the ratio to acquire a fourth length, and determining position points having the fourth length to the camera position information in the projection direction as the plurality of virtual three-dimensional points.

8. The method according to claim 1, further comprising:
determining a projection addition region according to the human eye position information and the plurality of pieces of original position information; and adding a shadow image corresponding to the target object model in the projection addition region.

9. A non-transitory computer-readable storage medium, storing a computer program, wherein the computer program, when executed by a processor, cause the processor to perform the displaying method for a three-dimensional object according to claim 1.

10. A displaying apparatus for a three-dimensional object, comprising:
an acquiring module configured to acquire a plurality of pieces of original position information of a plurality of associated three-dimensional points in a target object model, acquire human eye position information of human eye, and acquire display position information of a preset picture display region in a picture display device;

a determining module configured to determine a plurality of pieces of projection position information of the plurality of associated three-dimensional points on the preset picture display region according to the plurality of pieces of original position information, the human eye position information, and the display position information, wherein the projection position information is projection position information points of the plurality of associated three-dimensional points that are viewed according to the human eye position information and projected onto the preset picture display region when transferred in a sight line light path; and a rendering module configured to generate and render a projection picture of the target object model in the preset picture display region according to the plurality of pieces of projection position information, wherein the determining module is further configured to:
construct connecting straight lines of the human eye position information and each piece of original position information; and determine intersection points of the connecting straight lines of the plurality of pieces of original position information and the display position information as the plurality of pieces of projection position information.

11. An electronic device, comprising:
a processor; and
a memory configured to store instructions executable by the processor,
wherein the processor is configured to read the executable instructions from the memory and execute the instructions to:
acquire a plurality of pieces of original position information of a plurality of associated three-dimensional points in a target object model, acquire human eye position information of human eye, and acquire display position information of a preset picture display region in a picture display device;

determine a plurality of pieces of projection position information of the plurality of associated three-dimensional points on the preset picture display region according to the plurality of pieces of original position information, the human eye position information, and the display position information, wherein the projection position information is projection position information points of the plurality of associated three-dimensional points that are viewed according to the human eye position information and projected onto the preset picture display region when transferred in a sight line light path; and generate and render projection picture of the target object model in the preset picture display region according to the plurality of pieces of projection position information, wherein determining the plurality of pieces of projection position information of the plurality of associated three-dimensional points on the picture display region according to the plurality of pieces of original position information, the human eye position information, and the display position information comprises:
constructing connecting straight lines of the human eye position information and each piece of original position information; and determining intersection points of the connecting straight lines of the plurality of pieces of original position information and the display position information as the plurality of pieces of projection position information.

12. The electronic device according to claim 11, wherein when the picture display device comprises a camera thereon, acquire the human eye position information of the human eye comprises:
acquire first relative position information of the human eye relative to the camera;
acquire second relative position information of the camera relative to the preset picture display region;
determine third relative position information of the human eye to the preset picture display region according to the first relative position information and the second relative position information; and
calculate the human eye position information according to the display position information and the third relative position information.

13. The electronic device according to claim 12, wherein acquire the first relative position information of the human eye relative to the camera comprises:
acquire fourth relative position information of the human eye relative to a human face;
acquire a human face image shot by the camera, and performing calculation on the human face image according to a preset algorithm to obtain fifth relative position information of the human face image relative to the camera; and
calculate the first relative position information according to the fourth relative position information and the fifth relative position information.

14. The electronic device according to claim 12, wherein calculate the human eye position information according to the display position information and the third relative position information comprises:
acquire a first coordinate system for locating the display position information, and obtaining a second coordinate system for locating the plurality of pieces of original position information;

determine whether the first coordinate system is aligned with the second coordinate system;

if not aligned, align the first coordinate system and the second coordinate system to acquire a target coordinate system; and acquire reference position information for the display position information under the target coordinate system, and determine a position of the third relative position information at the reference position information as the human eye position information.

15. The electronic device according to claim 11, wherein generate and render a projection picture of the target object model in the picture display region according to the plurality of pieces of projection position information comprises:

calculate a length relationship of each piece of original position information, the human eye position information, and the projection position information;

calculate a plurality of virtual three-dimensional points corresponding to the plurality of associated three-dimensional points according to the length relationship and camera position information of a preset camera model, wherein a visual cone plane of the camera model is parallel tangent to the picture display region, and construct a virtual three-dimensional object model according to the virtual three-dimensional points, and generate and render the projection picture of the virtual three-dimensional object model projected onto the picture display region according to a projection transform matrix of the preset camera model.

16. The electronic device according to claim 11, wherein calculate a length relationship of each piece of original position information, the human eye position information, and the projection position information comprises:

calculate a first length and a second length of the human eye position information to each piece of original position information and a corresponding plurality of pieces of projection position information, respectively; and calculate a ratio of the first length to the second length as the length relationship.

17. The electronic device according to claim 16, wherein calculate a plurality of virtual three-dimensional points corresponding to the plurality of associated three-dimensional points according to the length relationship and camera position information of a preset camera model comprises:

determine a projection direction according to the camera position information and each piece of projection position information;

determine a third length between the camera position information and the corresponding plurality of pieces of projection position information in the projection direction; and calculate a product of the third length and the ratio to acquire a fourth length, and determine position points having the fourth length to the camera position information in the projection direction as the plurality of virtual three-dimensional points.

18. The electronic device according to claim 11, the processor is further configured to execute the instructions to:

determine a projection addition region according to the human eye position information and the plurality of pieces of original position information; and add a shadow image corresponding to the target object model in the projection addition region.

* * * * *